(12) United States Patent
Muralidharan et al.

(10) Patent No.: US 10,979,358 B2
(45) Date of Patent: Apr. 13, 2021

(54) LOW-LATENCY DATA PACKET DISTRIBUTOR

(71) Applicant: Smart IOPS, Inc., Milpitas, CA (US)

(72) Inventors: Kirankumar Muralidharan, Bangalore (IN); Sathishkumar Udayanarayanan, Bangalore (IN); Ashutosh Das, Cupertino, CA (US)

(73) Assignee: SMART IOPS, INC., Milpitas, CA (US)

( * ) Notice: Subject to any disclaimer, the term of this patent is extended or adjusted under 35 U.S.C. 154(b) by 0 days.

(21) Appl. No.: 16/545,484

(22) Filed: Aug. 20, 2019

(65) Prior Publication Data

US 2021/0058336 A1 Feb. 25, 2021

(51) Int. Cl.
*H04L 12/863* (2013.01)
*H04L 12/861* (2013.01)
*H04L 12/833* (2013.01)

(52) U.S. Cl.
CPC .......... *H04L 47/6245* (2013.01); *H04L 47/31* (2013.01); *H04L 47/622* (2013.01); *H04L 49/9078* (2013.01)

(58) Field of Classification Search
CPC ... H04L 47/6245; H04L 47/31; H04L 47/622; H04L 49/9078
See application file for complete search history.

(56) References Cited

U.S. PATENT DOCUMENTS

| | | | | |
|---|---|---|---|---|
| 6,320,861 | B1* | 11/2001 | Adam | H04L 12/5601 370/395.7 |
| 6,625,159 | B1* | 9/2003 | Singh | H04L 49/103 370/235 |
| 6,687,247 | B1* | 2/2004 | Wilford | H04L 45/00 370/392 |
| 7,792,131 | B1* | 9/2010 | Ma | H04L 47/215 370/412 |
| 9,531,647 | B1* | 12/2016 | Goyal | H04L 67/325 |
| 10,067,691 | B1* | 9/2018 | Gadelrab | G06F 13/1663 |
| 2003/0099254 | A1* | 5/2003 | Richter | H04L 12/2854 370/466 |
| 2005/0047334 | A1* | 3/2005 | Paul | H04L 12/5601 370/229 |
| 2007/0121499 | A1* | 5/2007 | Pal | H04L 49/1515 370/230 |
| 2010/0050177 | A1* | 2/2010 | Goyal | G06F 21/552 718/102 |

(Continued)

*Primary Examiner* — Blake J Rubin
(74) *Attorney, Agent, or Firm* — Chip Law Group

(57) ABSTRACT

A data packet distributor (DPD) includes a memory and a data packet transmission device (DPTD) connected to the memory. The DPTD receives a first data packet and identifies a destination queue for attempting transmission of the first data packet. The attempt for transmission is unsuccessful when a second data packet associated with the identified destination queue is present in the memory or the identified destination queue is unavailable for receiving the first data packet. The DPTD stores the first data packet in the memory when the attempt is unsuccessful. The DPTD re-attempts the transmission of the first data packet to the identified destination queue at end of a time interval. The re-attempt is successful when the second data packet is absent in the memory and the identified destination queue is available for receiving the first data packet.

20 Claims, 18 Drawing Sheets

(56) References Cited

U.S. PATENT DOCUMENTS

| | | | | |
|---|---|---|---|---|
| 2010/0293353 A1* | 11/2010 | Sonnier | ............... | H04L 49/101 |
| | | | | 711/170 |
| 2011/0286449 A1* | 11/2011 | Ichino | ............... | H04L 1/1874 |
| | | | | 370/389 |
| 2013/0034100 A1* | 2/2013 | Goyal | ............... | G06F 12/0868 |
| | | | | 370/392 |
| 2013/0315260 A1* | 11/2013 | Adiraju | ............... | H04L 47/27 |
| | | | | 370/415 |
| 2015/0222443 A1* | 8/2015 | Basso | ............... | H04L 12/881 |
| | | | | 370/230 |
| 2016/0337257 A1* | 11/2016 | Yifrach | ............... | H04L 47/6205 |
| 2017/0220390 A1* | 8/2017 | Jain | ............... | G06F 9/50 |
| 2019/0245799 A1* | 8/2019 | Kumar | ............... | H04L 67/1097 |
| 2019/0342225 A1* | 11/2019 | Sanghi | ............... | H04L 47/6205 |

* cited by examiner

LOW-LATENCY DATA PACKET DISTRIBUTOR

FIELD OF THE INVENTION

The present invention relates generally to communication networks, and more particularly, to a low-latency data packet distributor for distributing data packets across multiple nodes of a communication network.

BACKGROUND

In a typical communication network, a data packet transmission system (DPTS) transmits data packets associated with a host system to one or more nodes of the communication network, in a first-in-first-out (FIFO) manner. In an example, the nodes correspond to NAND flash memory chips of a solid state drive (SSD). In another example, the nodes correspond to end devices (such as routers, switches, and the like).

FIG. 1 shows a block diagram of a conventional data packet transmission system (DPTS) 100 that transmits data packets in the FIFO manner. The DPTS 100 includes a data packet distributor (DPD) 102 that sequentially receives first through $n^{th}$ data packets P0-PN from the host system (not shown), and distributes (i.e., transmits) the first through $n^{th}$ data packets P0-PN to first through $m^{th}$ destination queues 104a-104m (hereinafter collectively referred to as "the destination queues 104"). Each data packet is associated with a corresponding destination queue, i.e., the first data packet P0 is associated with the first destination queue 104a. The first through $m^{th}$ destination queues 104a-104m include first through $m^{th}$ memories 106a-106m, respectively.

For transmitting the first data packet P0, the DPD 102 identifies the first destination queue 104a from the destination queues 104. The DPD 102 determines an availability of the first destination queue 104a for receiving the first data packet P0. The DPD 102 transmits the first data packet P0 to the first destination queue 104a if the first destination queue 104a is available for receiving the first data packet P0. If the DPD 102 determines that the first destination queue 104a is unavailable for receiving the first data packet P0 (i.e., the first memory 106a is full), the DPD 102 waits until the first destination queue 104a is available for receiving the first data packet P0. In a scenario, the second through $m^{th}$ destination queues 104b-104m are available for receiving the associated data packets. However, the transmission of the associated data packets to the available destination queues is blocked as the first data packet P0 is yet to be transmitted to the first destination queue 104a, thereby causing a head-of-line-blocking (HOLB) problem. The HOLB problem introduces a delay in the transmission of the associated data packets to the available destination queues. The delay is especially critical for real-time applications such as multimedia streaming, internet-protocol-television, and the like.

In light of the foregoing, it would be advantageous to have a method and a system that manages orderly transmission of data packets in a DPTS, and reduces the delay in the transmission of the data packets.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
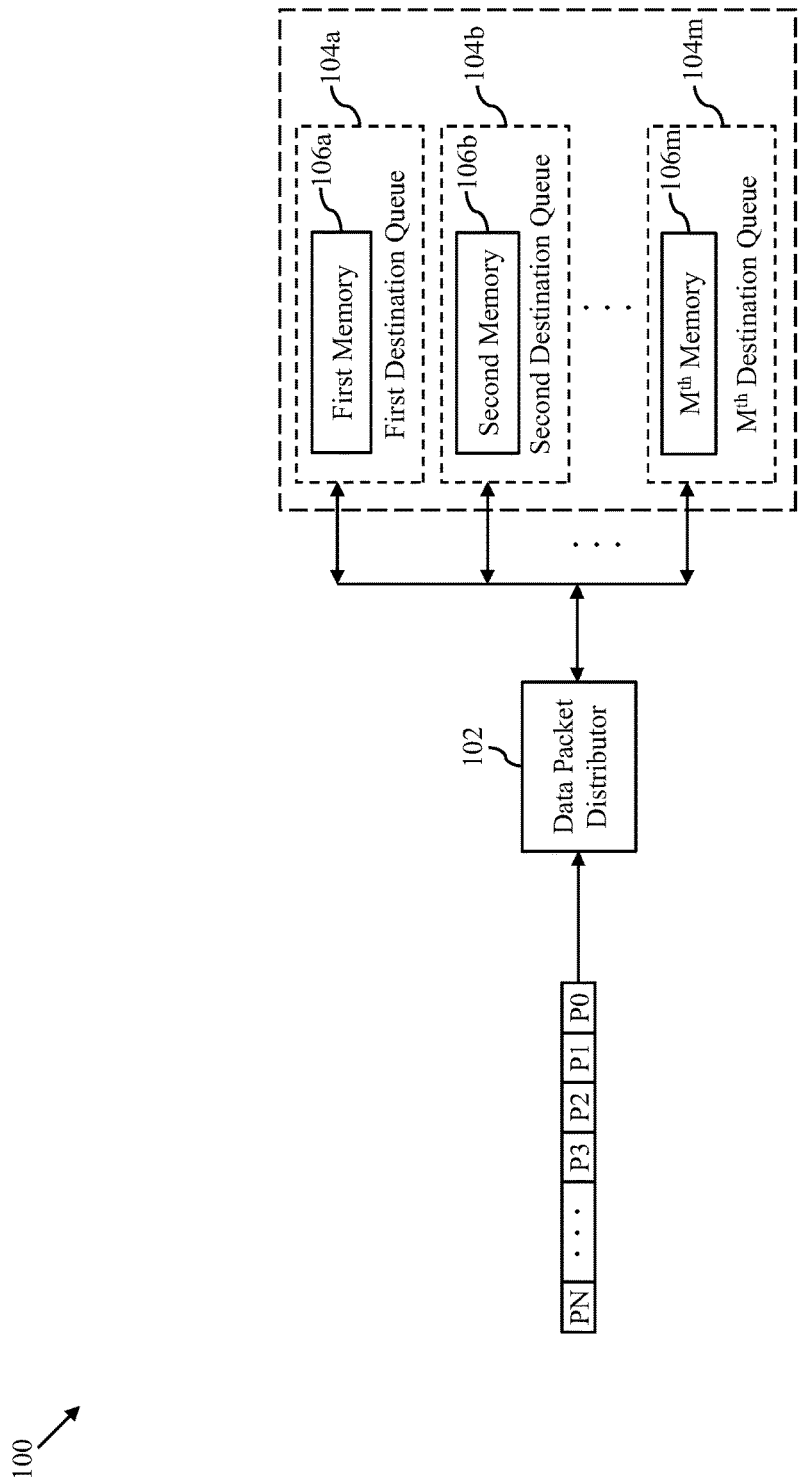
FIG. 1 shows a block diagram of a conventional data packet transmission system.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment, the present invention provides a data packet transmission method. The method includes receiving, by a data packet distributor (DPD), a first data packet from a first host. The method further includes identifying, by the DPD, to transmit the first data packet, a first destination queue that is associated with a second host. The method further includes attempting, by the DPD, transmission of the first data packet to the first destination queue based on an availability of the first destination queue for receiving the first data packet, and a presence of a second data packet associated with the first destination queue in a memory linked to the DPD. The method further includes storing, by the DPD, the first data packet in the memory when the transmission attempt is unsuccessful. The transmission attempt is unsuccessful when the second data packet is present in the memory or the first destination queue is unavailable for receiving the first data packet. The data packet transmission method further includes re-attempting, by the DPD, the transmission of the first data packet to the first destination queue. The transmission re-attempt is successful when the second data packet is transmitted to the first destination queue and the first destination queue is available for receiving the first data packet.

In another embodiment, the present invention provides a DPD. The DPD includes a memory and a data packet transmission device (DPTD) connected to the memory. The DPTD is configured to receive a first data packet from a first host. The DPTD is further configured to identify, for transmitting the first data packet, a first destination queue. The first destination queue is associated with a second host. The DPTD is further configured to attempt transmission of the first data packet to the first destination queue based on an availability of the first destination queue for receiving the first data packet and a presence of a second data packet associated with the first destination queue in the memory. The DPTD is further configured to store the first data packet in the memory when the attempt is unsuccessful. The attempt is unsuccessful when the second data packet is present in the memory or the first destination queue is unavailable for receiving the first data packet. The DPTD is further configured to re-attempt the transmission of the first data packet to the first destination queue. The transmission re-attempt is successful when the second data packet is transmitted to the first destination queue and the first destination queue is available for receiving the first data packet.

In yet another embodiment, the present invention provides a data packet transmission method. The method includes receiving, by a DPD, a first data packet from a first host. The method further includes identifying, by the DPD to transmit the first data packet, a first destination queue that is associated with a second host. The method further includes determining, by the DPD, an availability of the first destination queue for receiving the first data packet. The availability is determined by the DPD based on a status signal received from the first destination queue. The method further includes comparing, by the DPD, first and second values of first and second counters, respectively, that are associated with the first destination queue. The first value is indicative of a first count of data packets that are associated with the first destination queue and are stored in a memory linked to the DPD. The second value is indicative of a second count of data packets that are transmitted to the first destination queue from the first count of data packets.

The method further includes storing, by the DPD, the first data packet in the memory when the first and second values are unequal or the first destination queue is unavailable for receiving the first data packet. The inequality of the first value to the second value indicates that a second data packet associated with the first destination queue is present in the memory. The method further includes re-attempting, by the DPD, the transmission of the first data packet to the first destination queue. The re-attempt is successful when the second data packet is transmitted to the first destination queue and the first destination queue is available for receiving the first data packet. The second data packet is transmitted to the first destination queue when the second value is equal to a first tag associated with the first data packet. The first tag is associated with the first data packet based on the reception of the first data packet by the DPD.

Various embodiments of the present invention provide a method and a system for transmitting data packets from a first host to a second host. A DPD receives a first data packet from the first host. To transmit the first data packet, the DPD identifies a first destination queue associated with the second host. The DPD receives a status signal from the first destination queue. The status signal is indicative of a storage status of the first destination queue. The DPD determines an availability of the first destination queue for receiving the first data packet based on the status signal. The DPD attempts transmission of the first data packet to the first destination queue based on the availability of the first destination queue and a presence of a second data packet associated with the first destination queue in a memory linked to the DPD. The DPD stores the first data packet in the memory when the transmission attempt is unsuccessful. The transmission attempt is unsuccessful when the second data packet is present in the memory or the first destination queue is unavailable for receiving the first data packet. The DPD increments a first counter associated with the first destination queue when the first data packet is stored in the memory. The DPD re-attempts the transmission of the first data packet to the first destination queue. The transmission re-attempt is successful when the second data packet is transmitted to the first destination queue and the first destination queue is available for receiving the first data packet. The DPD increments a second counter associated with the first destination queue when the transmission re-attempt is successful.

The DPD transmits data packets in an orderly manner without causing the HOLB problem by way of the memory and the first and second counters. Hence, the delay during the transmission of the data packets by the DPD reduces as compared to the delay in the transmission by conventional DPDs. The reduction in the delay reduces glitches that occur due to the delay (i.e., latency glitches).

Figure 2:
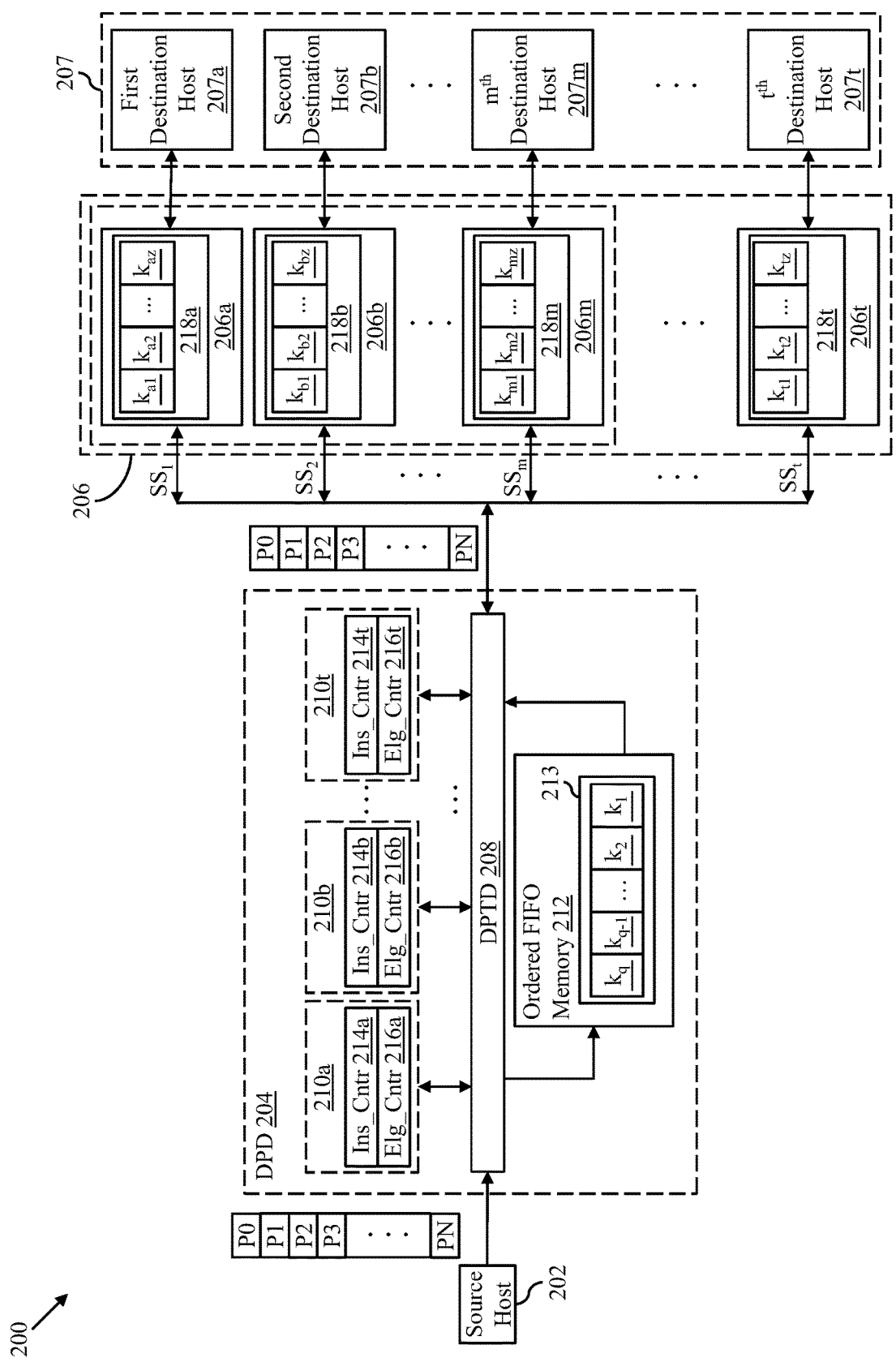
FIG. 2 is a block diagram that illustrates a data packet transmission system (DPTS) in accordance with an embodiment of the present invention.

FIG. 2 is a block diagram that illustrates a data packet transmission system (DPTS) 200 in accordance with an embodiment of the present invention. The DPTS 200 includes a source host 202, a data packet distributor (DPD) 204, and a set of destination queues 206 which is associated with a set of destination hosts 207. In one embodiment, each destination queue is associated with a corresponding destination host. In another embodiment, each destination queue is associated with a single destination host. The source host 202 generates first through $n^{th}$ data packets P0-PN (hereinafter collectively referred to as "data packets P0-PN"). Each data packet includes a header and a payload. In an example, the source host 202 and the set of destination hosts 207 are associated with a solid-state-drive (SSD). In another example, the source host 202 and the set of destination hosts 207 are nodes (such as routers, switches, and the like) of a communication network. The DPD 204 receives the data packets P0-PN from the source host 202 and attempts to distribute (i.e., transmit) the data packets P0-PN to the set of destination queues 206. In an example, the DPD 204 is a data packet distributor of an SSD controller of the SSD. The data packet distributor is configured to transmit the data packets P0-PN to destination queues associated with the SSD. In another example, the DPD 204 is a node of the communication network.

The DPD 204 includes a data packet transmission device (DPTD) 208, first through $t^{th}$ sets of counters 210a-210t, and an ordered first-in-first-out (FIFO) memory 212. The DPTD 208 is associated with the transmission of the data packets P0-PN according to a sequence of reception of the data packets P0-PN. The structure of the DPTD 208 is explained in detail in FIG. 4. The ordered FIFO memory 212 includes a first buffer memory 213 for storing the data packets P0-PN.

The set of destination queues 206 includes first through $t^{th}$ destination queues 206a-206t and the set of destination hosts 207 includes first through $t^{th}$ destination hosts 207a-207t. The first, second, $m^{th}$, and $t^{th}$ destination queues 206a, 206b, 206m, and 206t are associated with the first, second, $m^{th}$, and $t^{th}$ destination hosts 207a, 207b, 207m, and 207t, respectively. The first through $t^{th}$ destination queues 206a-206t are connected to the DPTD 208 for receiving the data packets P0-PN. Each destination queue may be associated with a NAND flash memory chip of the SSD or correspond to a memory device of the associated destination host. Further, each destination queue may be associated with multiple NAND flash memory chips or correspond to multiple memory devices. Furthermore, two or more destination queues may be associated with a single NAND flash memory chip or correspond to a single memory device.

Each of the first through $t^{th}$ destination queues 206a-206t transmits a corresponding status signal to the DPD 204 for indicating a storage status of the destination queue (i.e., an availability of the destination queue for receiving at least one data packet). Thus, the first destination queue 206a transmits a first status signal $SS_1$, the second destination queue 206b transmits a second status signal $SS_2$, the $m^{th}$ destination queue 206m transmits an $m^{th}$ status signal $SS_m$, and the $t^{th}$ destination queue 206t transmits a $t^{th}$ status signal $SS_t$. Further, each destination queue is associated with a corresponding set of counters. Thus, the first set of counters 210a is associated with the first destination queue 206a, the second set of counters 210b is associated with the second destination queue 206b, and the $t^{th}$ set of counters 210t is associated with the $t^{th}$ destination queue 206t. In an embodiment, each counter is an up-counter.

The first through $t^{th}$ sets of counters 210a-210t are initialized to '0' when the DPD 204 is powered-ON or when the DPD 204 receives a reset signal (not shown) from an external processor (not shown) that is communicatively coupled to the DPD 204. Each of the first through $t^{th}$ sets of counters 210a-210t includes at least two counters, i.e., an "insertion counter" (hereinafter referred to as "Ins_Cntr") and an "eligible counter" (hereinafter referred to as "Elg_Cntr"). Thus, the first set of counters 210a includes a first Ins_Cntr 214a and a first Elg_Cntr 216a, the second set of counters 210b includes a second Ins_Cntr 214b and a second Elg_Cntr 216b, and the $t^{th}$ set of counters 210t includes a $t^{th}$ Ins_Cntr 214t and a $t^{th}$ Elg_Cntr 216t. Each Ins_cntr and each Elg_Cntr are associated with the corresponding destination queue. Thus, the first Ins_Cntr 214a and the first Elg_Cntr 216a are associated with the first destination queue 206a, the second Ins_Cntr 214b and the second Elg_Cntr 216b are associated with the second destination queue 206b, and the $t^{th}$ Ins_Cntr 214m and the $t^{th}$ Elg_Cntr 216m are associated with the $t^{th}$ destination queue 206t.

Each Ins_Cntr is incremented when a data packet associated with the corresponding destination queue is stored in the ordered FIFO memory 212. In an embodiment, a count of an Ins_Cntr (such as the first Ins_Cntr 214a) is indicative of a number of data packets associated with the corresponding destination queue (i.e., the first destination queue 206a) that are received and stored in the ordered FIFO memory 212. Further, each Elg_Cntr is incremented when the data packet stored in the ordered FIFO memory 212 is transmitted to the corresponding destination queue. Thus, a count of an Elg_Cntr (such as the first Elg_Cntr 216a) is indicative of a number of data packets that are successfully transmitted to the corresponding destination queue (i.e., the first destination queue 206a) from the ordered FIFO memory 212 by the DPTD 208. Further, a difference between counts of corresponding Ins_Cntr and Elg_Cntr is indicative of a number of data packets associated with the corresponding destination queue that are stored in the ordered FIFO memory 212. In another embodiment, the Ins_Cntr and the Elg_Cntr counters are reset to zero upon reaching a threshold count. Thus, a count of an Ins_Cntr is indicative of a number of data packets associated with the corresponding destination queue that are received and stored in the ordered FIFO memory 212 after the reset, and a count of an Elg_Cntr is indicative of a number of data packets that are successfully transmitted to the corresponding destination queue from the ordered FIFO memory 212 after the reset. Although the present invention describes that the DPD 204 includes the first through $t^{th}$ sets of counters 210a-210t, the present invention is not limited to it. It will be understood by a person skilled in the art that the first through $t^{th}$ sets of counters 210a-210t may be external to the DPD 204.

Each destination queue includes a corresponding memory. Thus, the first destination queue 206a includes a first memory 218a, the second destination queue 206b includes a second memory 218b, the $m^{th}$ destination queue 206m includes an $m^{th}$ memory 218m, and the $t^{th}$ destination queue 206t includes a $t^{th}$ memory 218t. Further, each memory includes first through $z^{th}$ memory blocks such that 'z' is an average number of data packets that are associated with the DPTS 200 at any instance of time. Thus, the first memory 218a includes first through $z^{th}$ memory blocks $k_{a1}$-$k_{az}$, the second memory 218b includes first through $z^{th}$ memory blocks $k_{b1}$-$k_{bz}$, the $m^{th}$ memory 218m includes first through $z^{th}$ memory blocks $k_{m1}$-$k_{mz}$, and the $t^{th}$ memory 218t includes first through $z^{th}$ memory blocks $k_{t1}$-$k_{tz}$. A size of each memory block is such that each memory block is configured to store a data packet completely.

On receiving a data packet, the DPTD 208 identifies a destination queue for transmitting the data packet. In an embodiment, the DPTD 208 identifies the destination queue based on a header included in the data packet. The DPTD 208 attempts transmission of the data packet based on a first set of rules that includes first and second rules. The first rule is based on an availability of the destination queue for receiving the data packet. The DPTD 208 determines the availability of the destination queue based on the received status signal from the destination queue. The second rule is based on an equality of counts of the corresponding Ins_Cntr and Elg_Cntr that are associated with the identified destination queue. The transmission attempt is successful when the first and second rules are satisfied. Thus, the attempt of transmission is unsuccessful when one of the first or second rule is unsatisfied, i.e., when the identified destination queue is unavailable or when the counts are unequal. The DPTD 208 stores the received data packet in the ordered FIFO memory 212 when the transmission attempt is unsuccessful. In an embodiment, the second rule is executed only if the first rule is satisfied. In another embodiment, the first rule is executed only if the second rule is satisfied. In yet another embodiment, the first and second rules are executed simultaneously. For the sake of ongoing discussion, it is assumed that the first and second rules are executed sequentially, i.e., the second rule is executed only when the first rule is satisfied.

The DPTD 208 further generates at least two tags for the data packet when the transmission attempt is unsuccessful, based on a second set of rules. The second set of rules includes third and fourth rules. The third rule is based on a generation of a first tag, i.e., a queue ID (QID) which is an identifier of the destination queue. The fourth rule is based on a generation of a second tag, i.e., an insert ID (IID). The IID of a data packet associated with a destination queue is equal to a count of the corresponding Ins_Cntr when the data packet is received. In an example, the first data packet P0 is received before the second data packet P1. Further, the first and second data packets P0 and P1 are associated with the first destination queue 206a which is unavailable for receiving the first and second data packets P0 and P1. The DPTD 208 thus generates first and second tags for each of the first and second data packets P0 and P1. The DPTD 208 generates a first QID='Qa' and a first IID='0' (i.e., the first Ins_Cntr $214a$='0' when the first data packet P0 is received) for the first data packet P0, and a second QID='Qa' and a second IID='1' (i.e., the first Ins_Cntr $214a$='1' when the second data packet P1 is received) for the second data packet P1. Based on the first and second QIDs and IIDs, the DPTD 208 transmits the first data packet P0 before the second data packet P1 when the first destination queue 206a is available for receiving a data packet.

The DPTD 208 stores the data packet and the corresponding first and second tags in the ordered FIFO memory 212. In an embodiment, the first buffer memory 213 includes first through $q^{th}$ memory blocks $k_1$-$k_q$. A size of each memory block is such that each memory block is configured to store the data packet and the corresponding first and second tags. In the example, the DPTD 208 stores the first data packet P0, the first QID, and the first IID in the first memory block $k_1$, and the second data packet P1, the second QID, and the second IID in the second memory block $k_2$. In another embodiment, the ordered FIFO memory 212 includes second and third buffer memories (not shown) each having first through $q^{th}$ memory blocks (not shown). A size of each memory block of the second buffer memory is such that each memory block is configured to store the data packet. Further, a size of each memory block of the third buffer memory is such that each memory block is configured to store the corresponding first and second tags (QID and IID). Thus, the second buffer memory stores the data packets of unsuccessful transmission attempts and the third buffer memory stores the corresponding first and second tags (QID and IID) associated with such data packets. Further, the ordered FIFO memory 212 generates a first indication signal (not shown) which indicates an occupancy status (i.e., a count of data packets stored in the ordered FIFO memory 212.

At any instance of time, the DPD 204 may receive up to 'm*o' number of data packets associated with a subset of destination queues (such as the first through $m^{th}$ destination queues 206a-206m) such that 'o' is an average number of data packets associated with a destination queue (such as the first destination queue 206a) when the first destination queue 206a is unavailable. In an embodiment, a value of 'o' is determined based on historical data associated with the source host 202 (e.g., a rate at which the source host 202 generates the data packets P0-PN). However, the subset of destination queues may be unavailable for receiving the associated data packets. Thus, 'm*o' number of data packets that are associated with the subset of destination queues undergo unsuccessful transmission attempts by the DPD 204. Hence, the ordered FIFO memory 212 is able to store a maximum of 'q' (i.e., the number of memory blocks) ='m*o' number of data packets that are associated with the subset of destination queues.

The DPTD 208 re-attempts transmission of the stored data packets after an elapse of a time interval (i.e., a re-attempt time interval). In an embodiment, the time interval is dynamically adjusted by the DPTD 208 based on data traffic associated with the DPTS 200. The DPTD 208 adjusts the time interval based on at least one of a rate of reception of the data packets associated with the identified destination queue, a time duration for which the identified destination queue is unavailable, and the occupancy status of the ordered FIFO memory 212 (i.e., the count of data packets stored in the ordered FIFO memory 212). The DPTD 208 re-attempts transmission of the stored data packets based on a third set of rules that includes fifth through seventh rules. Based on the fifth rule, the DPTD 208 re-attempts the transmission of the data packet that is stored in the first memory block $k_1$.

The DPTD 208 retrieves the data packet stored in the first memory block $k_1$ and the corresponding first and second tags. In an embodiment, the DPTD 208 rearranges contents (i.e., a data packet and corresponding first and second tags) stored in each memory block. Thus, the contents of the $q^{th}$ memory block $k_q$ are moved to the $(q-1)^{th}$ memory block $k_{(q-1)}$, contents of the $(q-1)^{th}$ memory block $k_{(q-1)}$ are moved to the $(q-2)^{th}$ memory block (not shown), and contents of the second memory block $k_2$ are moved to the first memory block $k_1$. The fifth rule ensures that the data packet stored in the first memory block $k_1$ eliminates a head-of-line blocking (HOLB) problem for the data packets stored in the second through $q^{th}$ memory blocks $k_2$-$k_q$. In another embodiment, the ordered FIFO memory 212 further includes read and write pointers (not shown) that point to the first through $q^{th}$ memory blocks $k_1$-$k_q$. Upon reception of the reset signal, the read and write pointers point to the first memory block $k_1$. The write pointer points to a subsequent memory block after every write operation (i.e., when a data packet is stored in a memory block), and the read pointer points to a subsequent memory block after every read operation. Thus, upon retrieval of the data packet stored in the first memory block $k_1$, the read pointer points to the second memory block $k_2$.

When the read and write pointers point to a same memory block that is empty, a write operation occurs and the write pointer points to a subsequent memory block. Similarly, when the read and write pointers point to a same memory block that includes a data packet, a read operation occurs and the read pointer points to a subsequent memory block. Thus, based on the fifth rule, the DPTD 208 re-attempts transmission of a data packet stored in a memory block pointed by the read pointer. In such a scenario, the ordered FIFO memory 212 is a circular queue. Hence, when a data packet is stored in the $q^{th}$ memory block $k_q$, the write pointer points to the first memory block $k_1$. Similarly, when a data packet stored in the $q^{th}$ memory block $k_q$ is retrieved, the read pointer points to the first memory block $k_1$.

For the sake of ongoing discussion and without limiting the scope of the invention, it is assumed that, upon retrieval of a data packet based on the fifth rule, the contents of the ordered FIFO memory 212 are re-arranged.

The sixth rule is based on the availability of the identified destination queue for receiving the data packet. The seventh rule is based on an equality of a corresponding count of the Elg_Cntr associated with the identified destination queue and a value of the corresponding IID of the data packet. In an example, the seventh rule is based on the equality of the count of the first Elg_Cntr 216a and a value of the first IID (i.e., the first Elg_Cntr 216a=first IID='0'). When the third set of rules is satisfied, the transmission re-attempt of the data packet by the DPTD 208 is successful and the DPTD 208 increments the Elg_Cntr associated with the identified destination queue. The DPTD 208 thus increments the first Elg_Cntr 216a when the transmission re-attempt of the first data packet P0 is successful. In an example, the first data packet P0 is received before the third data packet P2. The first and third data packets P0 and P2 are associated with the first and second destination queues 206a and 206b, respectively, which are unavailable for receiving the first and third data packets P0 and P2. The DPTD 208 thus generates the first QID='Qa' and the first IID='0' for the first data packet P0, and a third QID='Qc' and a third IID='0' for the third data packet P2. After the time interval elapses, the DPTD 208 re-attempts, based on the fifth rule, transmission of a data packet that is presently stored in the first memory block $k_1$, i.e., the first data packet P0, although the first and second destination queues 206a and 206b are available simultaneously. The DPTD 208 further transfers the third data packet P2, the third QID, and the third IID in the first memory block $k_1$.

When the third set of rules is unsatisfied, the transmission re-attempt is unsuccessful and the DPTD 208 reinserts the data packet and the first and second tags in the ordered FIFO memory 212. In the example, when the transmission re-attempt of the first data packet P0 is unsuccessful, the DPTD 208 stores the first data packet in the second memory block $k_2$. After the time interval elapses, the DPTD 208 re-attempts, based on the fifth rule, transmission of a data packet that is presently stored in the first memory block $k_1$, i.e., the third data packet P2, although the first and second destination queues 206a and 206b are available simultaneously. In an embodiment, the seventh rule is executed only if the sixth rule is satisfied. In another embodiment, the sixth rule is executed only if the seventh rule is satisfied. In yet another embodiment, the sixth and seventh rules are executed simultaneously. For the sake of ongoing discussion, it is assumed that the sixth and seventh rules are executed sequentially, i.e., the seventh rule is executed only when the sixth rule is satisfied.

It will be apparent to a person having ordinary skill in the art that for a successful transmission attempt of a data packet, the first set of rules needs to be satisfied, and for a successful transmission re-attempt of the data packet, the third set of rules needs to be satisfied. Operation of the DPD 204 will be best understood by way of an example illustrated in FIGS. 3A-3K.

Figure 3A:
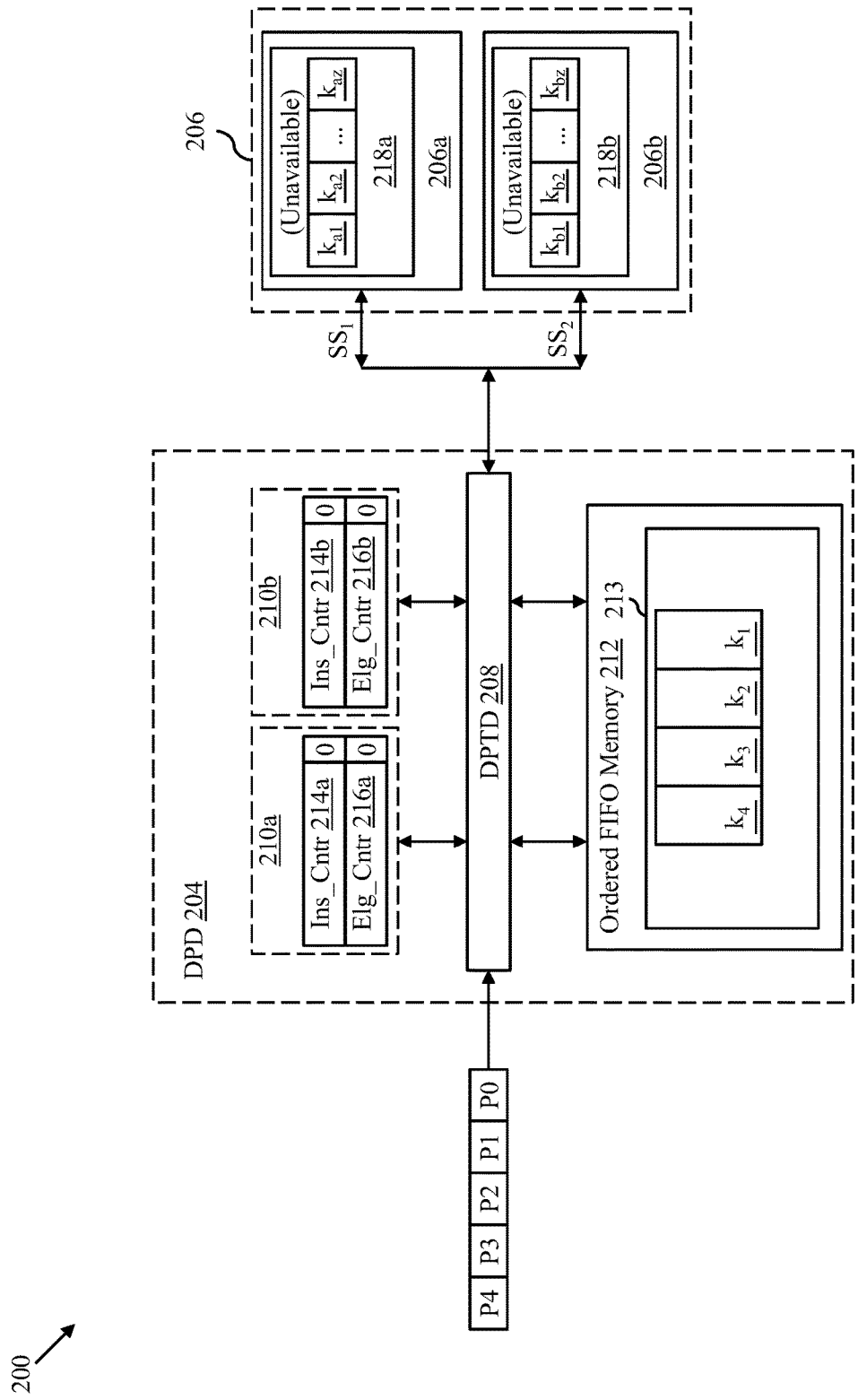
FIG. 3A is a block diagram that illustrates reception of first through fifth data packets by a data packet transmission device (DPTD) of a data packet distributor (DPD) of the DPTS of FIG. 2 in accordance with an embodiment of the present invention.

FIGS. 3A-3K, collectively, illustrate an exemplary operation of the DPD 204 in accordance with an embodiment of the present invention. FIG. 3A is a block diagram that illustrates reception of the first through fifth data packets P0-P4 from the source host 202 by the DPTD 208 in accordance with an embodiment of the present invention. The first Ins_Cntr 214a, the first Elg_Cntr 216a, the second Ins_Cntr 214b, and the second Elg_Cntr 216b are initialized to zero by the DPTD 208. The DPTD 208 receives and attempts to transmit the first through fifth data packets P0-P4 to the set of destination queues 206. For the sake of ongoing discussion and without limiting the scope of the invention, it is assumed that the first, fourth, and fifth data packets P0, P3, and P4 are associated with the first destination queue 206a, and the second and third data packets P1 and P2 are associated with the second destination queue 206b. Further, the first and second status signals $SS_1$ and $SS_2$ indicate unavailability of the first and second destination queues 206a and 206b, respectively.

Although it is shown that the first and second destination queues 206a and 206b receive data packets (i.e., the first through fifth data packets P0-P4) from the source host 202, the scope of the present invention is not limited to it. It will be apparent to a person skilled in the art that the first and second destination queues 206a and 206b may further receive data packets (not shown) from multiple source hosts (not shown) which are different from the source host 202. Thus, availability and unavailability of the first and second destination queues 206a and 206b are further dependent on the data packets received from the multiple source hosts.

Figure 3B:
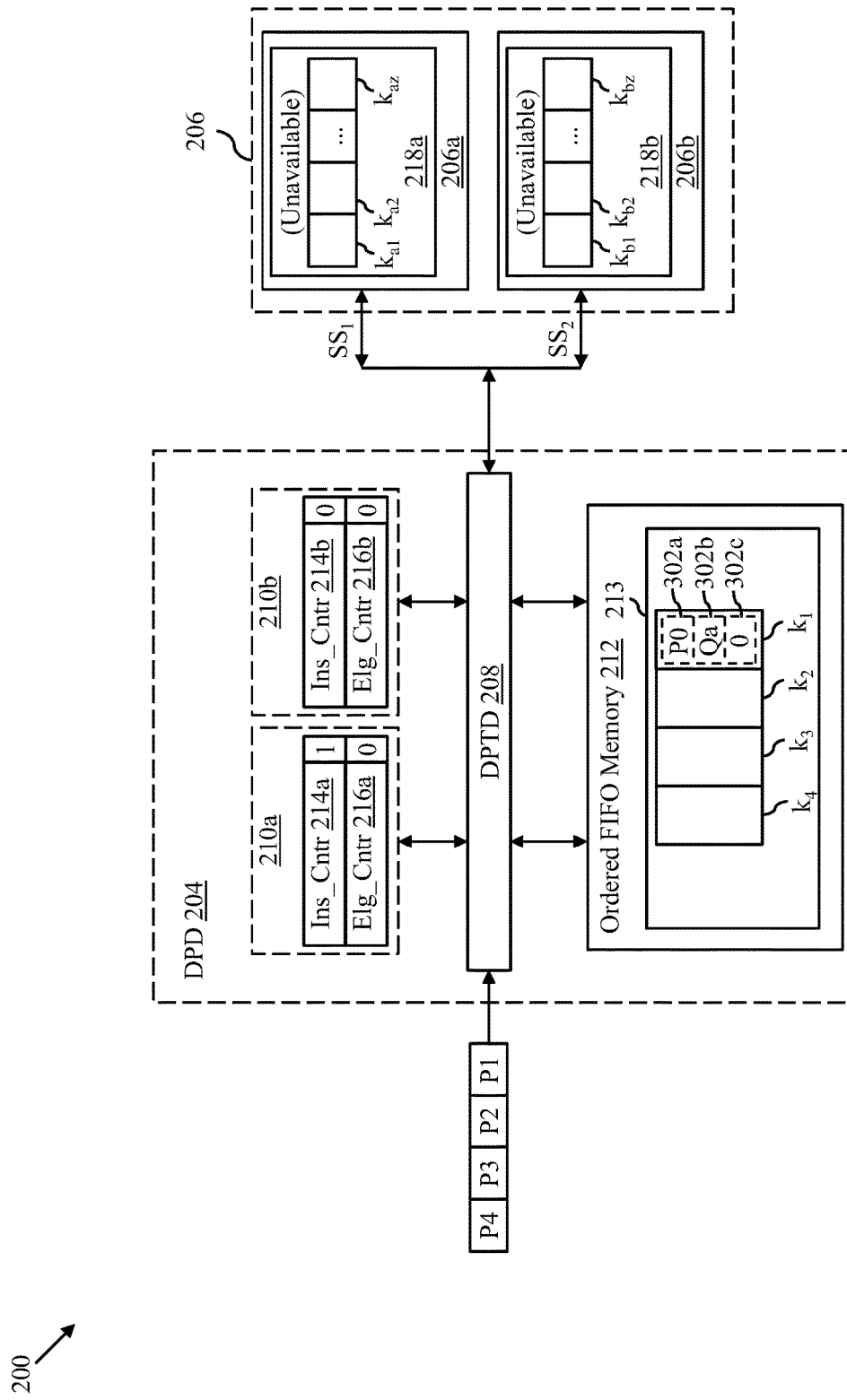
FIG. 3B is a block diagram that illustrates an attempt to transmit the first data packet by the DPTD to a first destination queue of the DPTS in accordance with an embodiment of the present invention.

FIG. 3B is a block diagram that illustrates an attempt to transmit the first data packet P0 by the DPTD 208 to the first destination queue 206a in accordance with an embodiment of the present invention. To transmit the first data packet P0, the DPTD 208 determines, based on the first rule, an availability of the first destination queue 206a for receiving the first data packet P0. Since the first status signal $SS_1$ indicates unavailability of the first destination queue 206a for receiving the first data packet P0 (as illustrated in FIG. 3A), the first rule is unsatisfied. Hence, the transmission attempt of the first data packet P0 is unsuccessful. As the transmission is unsuccessful, the DPTD 208 generates, based on the second set of rules, the first QID='Qa' (to indicate that the first data packet P0 is associated with the first destination queue 206a) and the first IID='0' (to indicate that the first data packet P0 needs to be transmitted when the first destination queue 206a is available). The DPTD 208 stores the first data packet P0, the first QID, and the first IID in the first memory block $k_1$, and increments the first Ins_Cntr 214a (i.e., the first Ins_Cntr 214a='1'). In an embodiment, the first memory block $k_1$ includes first through third memory sub-blocks 302a-302c for storing the first data packet P0, the first QID (i.e., 'Qa'), and the first IID (i.e., '0'), respectively. Further, the first and second destination queues 206a and 206b remain unavailable, and the unavailability is indicated by the first and second status signals $SS_1$ and $SS_2$, respectively.

Figure 3C:
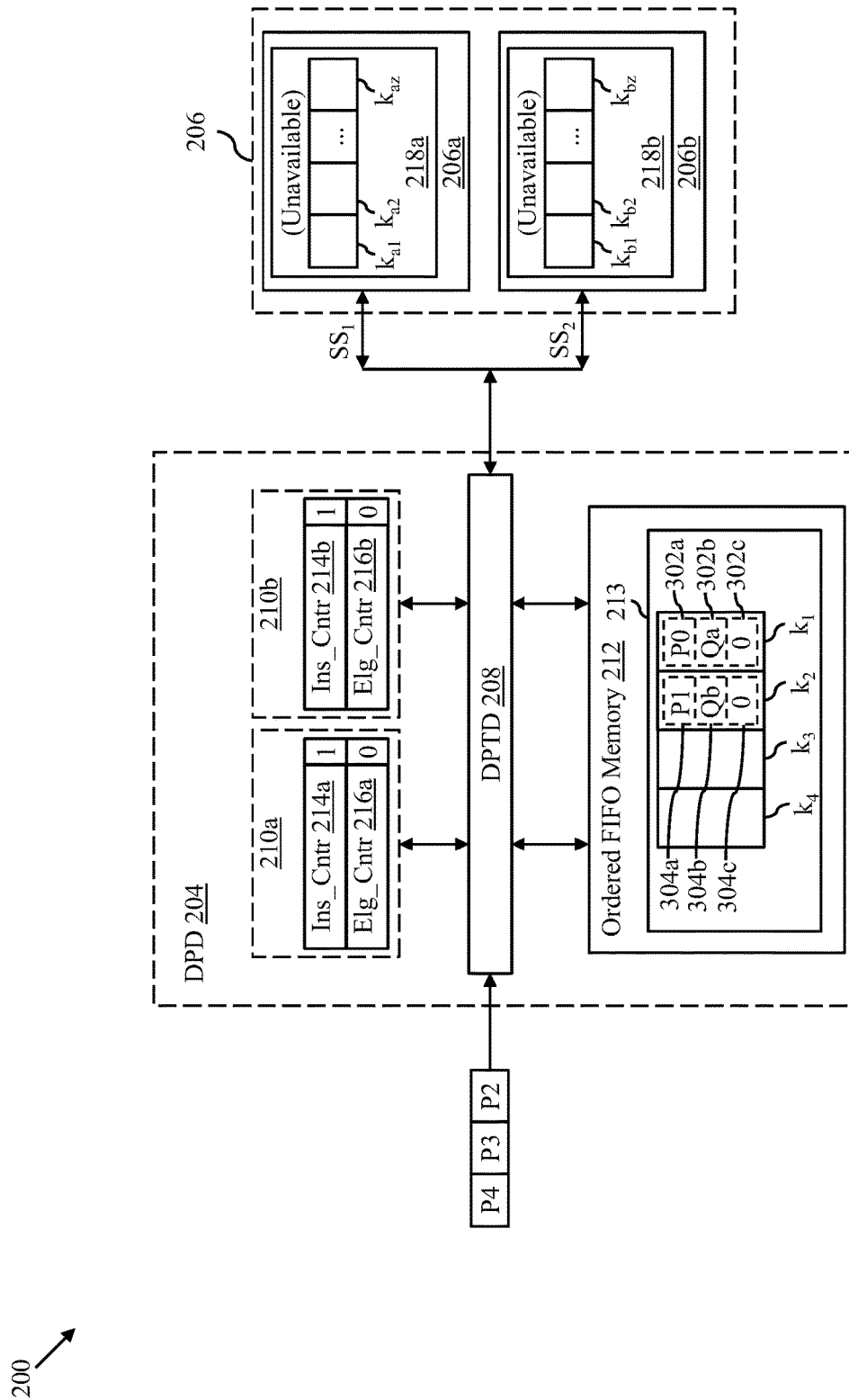
FIG. 3C is a block diagram that illustrates an attempt to transmit the second data packet by the DPTD to a second destination queue of the DPTS in accordance with an embodiment of the present invention.

FIG. 3C is a block diagram that illustrates an attempt to transmit the second data packet P1 by the DPTD 208 to the second destination queue 206b in accordance with an embodiment of the present invention. The DPTD 208 determines, based on the first rule, an availability of the second destination queue 206b for receiving the second data packet P1. Since the second status signal $SS_2$ indicates unavailability of the second destination queue 206b for receiving the second data packet P1 (as illustrated in FIG. 3B), the first rule is unsatisfied and hence the transmission attempt of the second data packet P1 is unsuccessful. The DPTD 208 generates, based on the second set of rules, a second QID='Qb' (to indicate that the second data packet P1 is associated with the second destination queue 206b) and a second IID='0' (to indicate that the second data packet P1 needs to be transmitted when the second destination queue 206b is available). The DPTD 208 stores the second data packet P1, the second QID, and the second IID in the second memory block $k_2$, and increments the second Ins_Cntr 214b (i.e., the second Ins_Cntr 214b='1'). In an embodiment, the second memory block $k_2$ includes fourth through sixth memory sub-blocks 304a-304c for storing the second data packet P1, the second QID, and the second IID, respectively. Further, the first and second destination queues 206a and 206b remain unavailable, and the first and second status signals $SS_1$ and $SS_2$ indicate the unavailability of the first and second destination queues 206a and 206b, respectively.

Figure 3D:
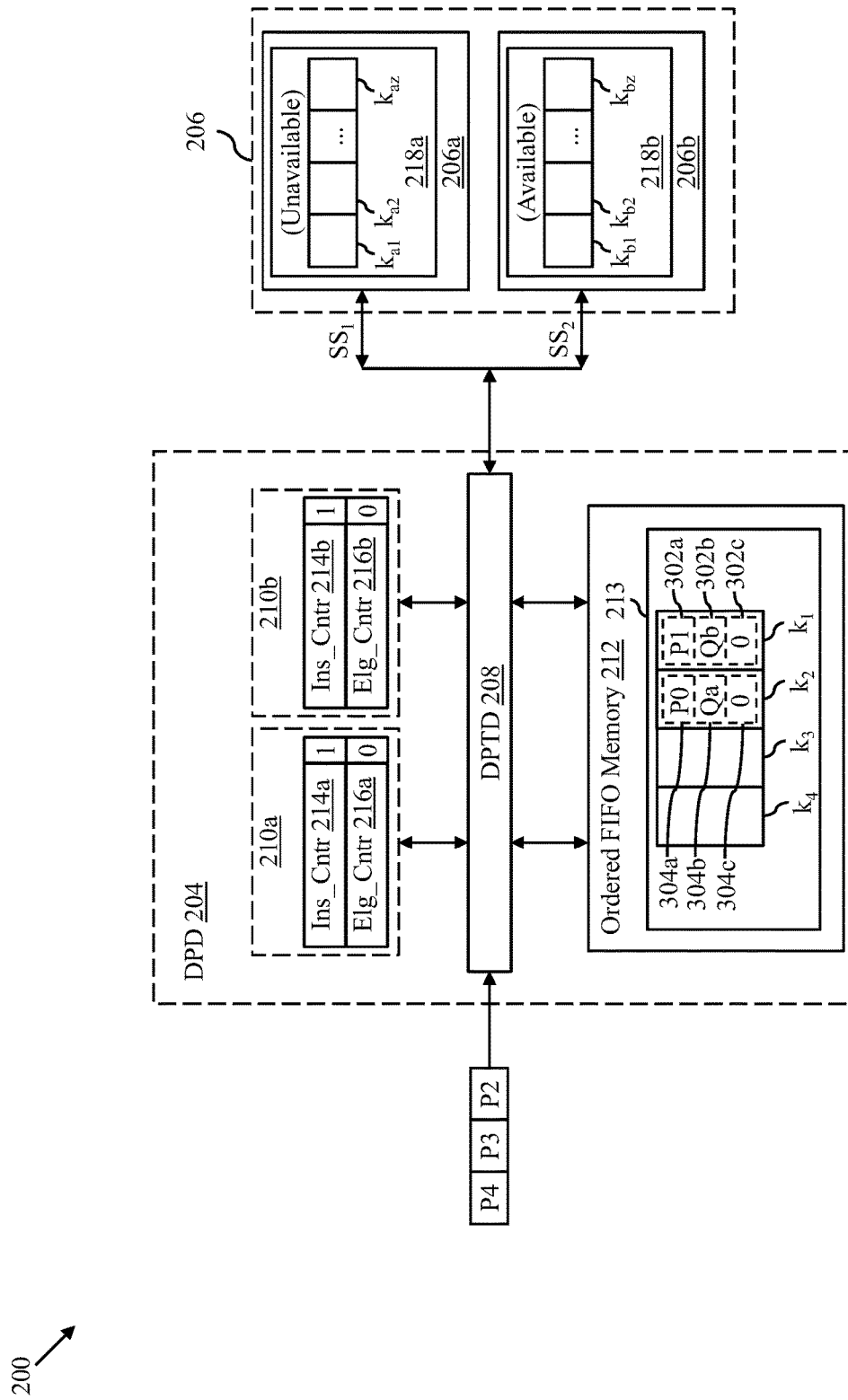
FIG. 3D is a block diagram that illustrates a re-attempt to transmit one of the first and second data packets by the DPTD in accordance with an embodiment of the present invention.

FIG. 3D is a block diagram that illustrates a re-attempt to transmit one of the first and second data packets P0 and P1 by the DPTD 208 in accordance with an embodiment of the present invention. The DPTD 208 re-attempts the transmission at the end of the time interval and based on the third set of rules. Thus, the DPTD 208 re-attempts the transmission of the first data packet P0 based on the fifth rule. The DPTD 208 retrieves the first data packet P0, the first QID, and the first IID from the first memory block $k_1$. The DPTD 208 further transfers contents of the second memory block $k_2$ to the first memory block $k_1$. Thus, the second data packet P1, the second QID, and the second BD are stored in the first through third memory sub-blocks 302a-302c, respectively. The DPTD 208 further determines the availability of the first destination queue 206a for receiving the first data packet P0 based on the sixth rule. As the first status signal $SS_1$ indicates unavailability of the first destination queue 206a for receiving the first data packet P0 (as illustrated in FIG. 3C), the sixth rule is unsatisfied. Hence, the transmission re-attempt of the first data packet P0 is unsuccessful. The DPTD 208 reinserts the first data packet P0, the first QID, and the first IID in the fourth through sixth memory sub-blocks 304a-304c, respectively. Further, the second destination queue 206b is available for receiving a data packet and the availability of the second destination queue 206b is indicated by the second status signal $SS_2$. The first destination queue 206a, however, remains unavailable, and the first status signal $SS_1$ indicates the unavailability of the first destination queue 206a.

Figure 3E:
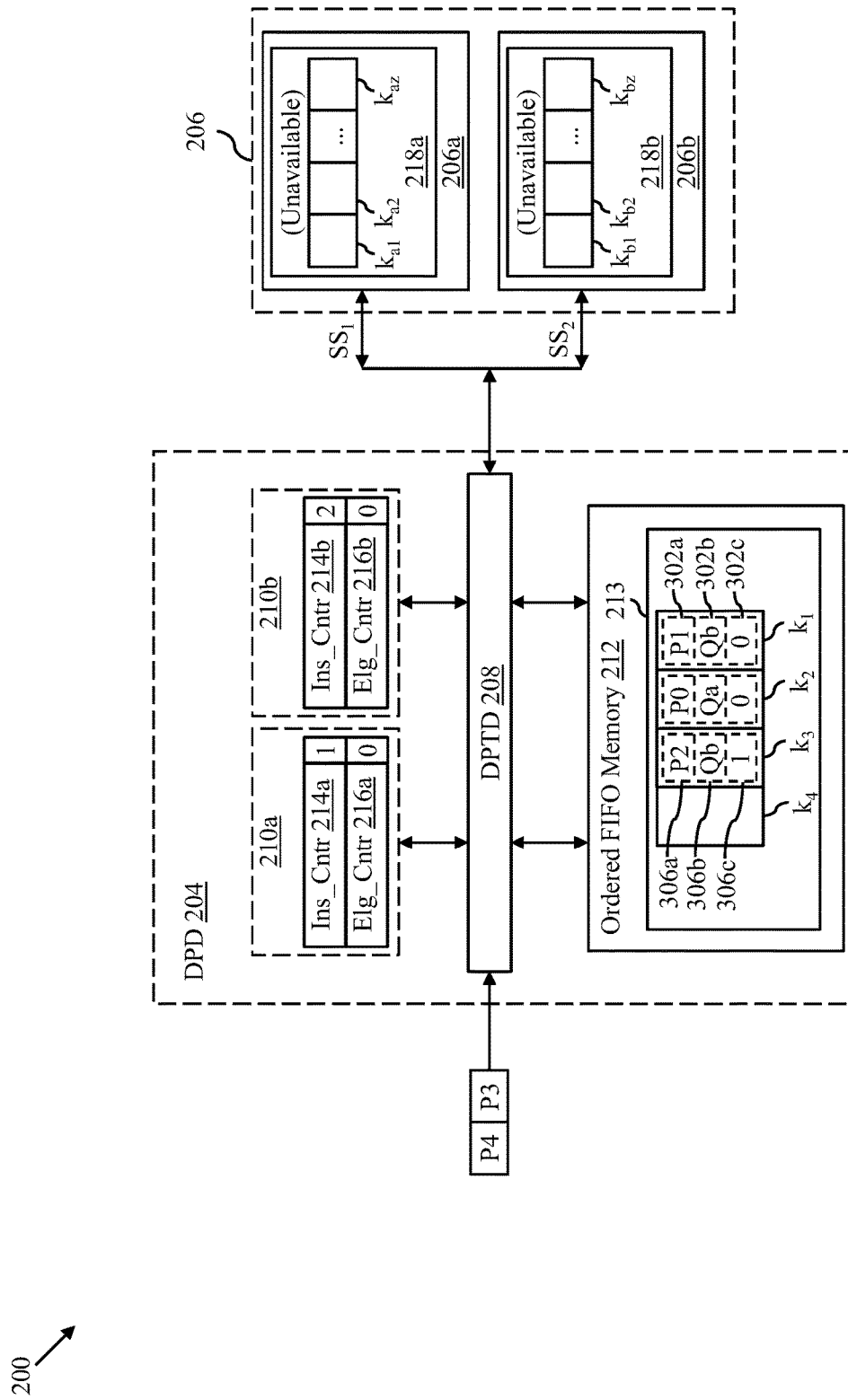
FIG. 3E is a block diagram that illustrates an attempt to transmit the third data packet by the DPTD to the second destination queue in accordance with an embodiment of the present invention.

FIG. 3E is a block diagram that illustrates an attempt to transmit the third data packet P2 by the DPTD 208 to the second destination queue 206b in accordance with an embodiment of the present invention. The DPTD 208 determines, based on the first rule, an availability of the second destination queue 206b for receiving the third data packet P2. Since the second status signal $SS_2$ indicates availability of the second destination queue 206b (as illustrated in FIG. 3D), the first rule is satisfied. The DPTD 208 further compares counts of the second Ins_Cntr 214b and the second Elg_Cntr 216b based on the second rule. As the counts are unequal, the second rule is unsatisfied. (i.e., another data packet associated with the second destination queue 206b is present in the ordered FIFO memory 212). Thus, the transmission attempt of the third data packet P2 is unsuccessful. The DPTD 208 generates, based on the second set of rules, a third QID='Qb' and a third IID='1' (as the second Ins_Cntr 214b='1' when the third data packet P2 is received). The DPTD 208 stores the third data packet P2, the third QID, and the third IID in the third memory block $k_3$, and increments the second Ins_Cntr 214b (i.e., the second Ins_Cntr 214b='2'). In an embodiment, the third memory block $k_3$ includes seventh through ninth memory sub-blocks 306a-306c for storing the third data packet P2, the third QID, and the third IID, respectively. Further, the second destination queue 206b is unavailable for receiving a data packet and the unavailability of the second destination queue 206b is indicated by the second status signal $SS_2$. The first destination queue 206a remains unavailable, and the first status signal $SS_1$ indicates the unavailability of the first destination queue 206a.

Figure 3F:
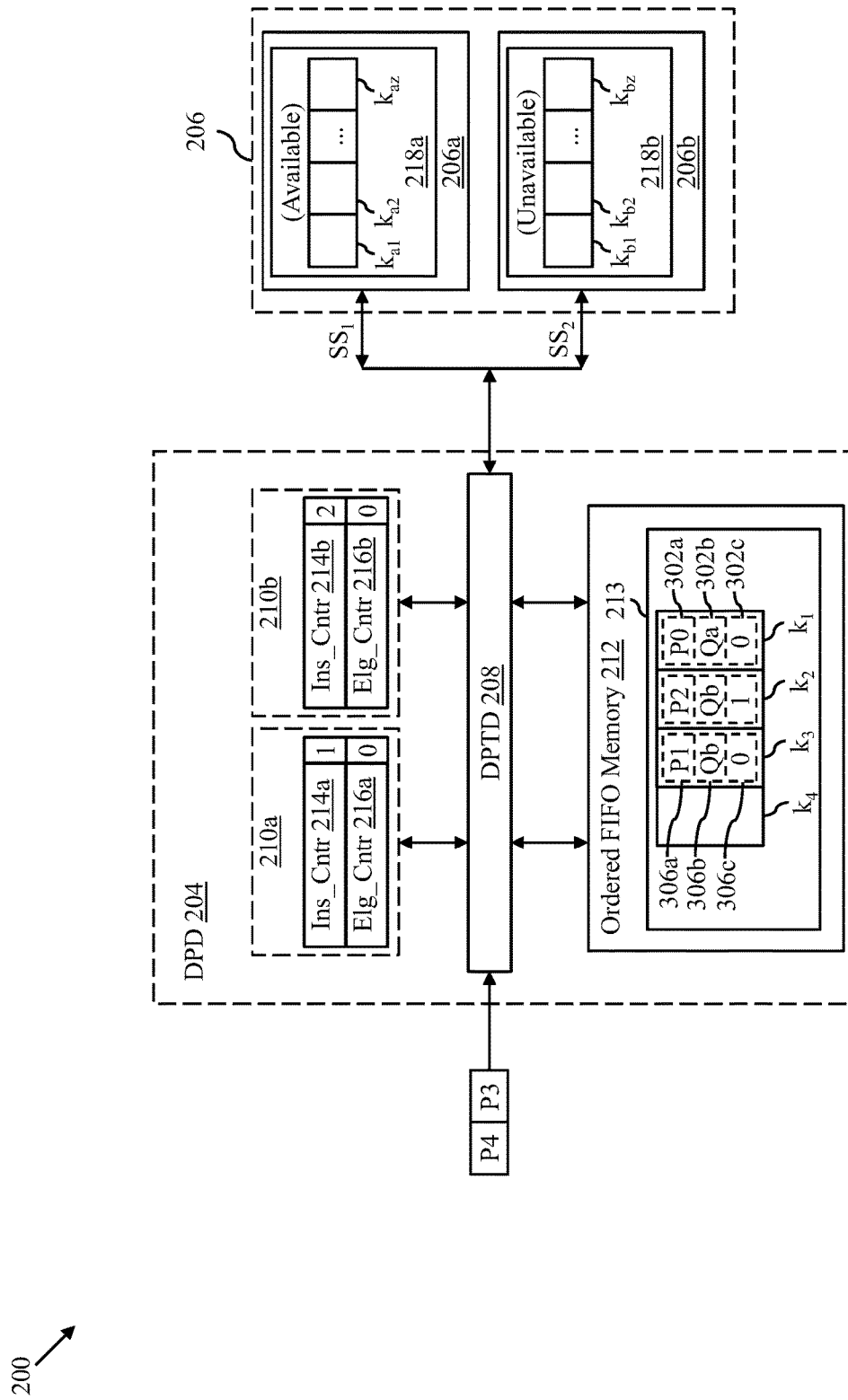
FIG. 3F is a block diagram that illustrates a re-attempt to transmit one of the first, second, and third data packets by the DPTD in accordance with an embodiment of the present invention.

FIG. 3F is a block diagram that illustrates a re-attempt to transmit one of the first, second, and third data packets P0, P1, and P2 by the DPTD 208 in accordance with an embodiment of the present invention. The DPTD 208 re-attempts the transmission at the end of the time interval and based on the third set of rules. Thus, the DPTD 208 re-attempts the transmission of the second data packet P1 based on the fifth rule. The DPTD 208 retrieves the second data packet P1, the second QID, and the second IID from the first memory block $k_1$. The DPTD 208 further transfers contents of the second memory block $k_2$ to the first memory block $k_1$, and contents of the third memory block $k_3$ to the second memory block $k_2$. Thus, the first data packet P0, the first QID, and the first IID are stored in the first through third memory sub-blocks 302a-302c, respectively, and the third data packet P2, the third QID, and the third IID are stored in the fourth through sixth memory sub-blocks 304a-304c, respectively. The DPTD 208 further determines the availability of the second destination queue 206b for receiving the second data packet P1 based on the sixth rule. Since the second status signal $SS_2$ indicates the unavailability of the second destination queue 206b for receiving the second data packet P1 (as illustrated in FIG. 3E), the sixth rule is unsatisfied. Hence, the transmission re-attempt of the second data packet P1 is unsuccessful. The DPTD 208 reinserts the second data packet P1, the second QID, and the second IID in the seventh through ninth memory sub-blocks 306a-306c, respectively. Further, the first destination queue 206a is available for receiving a data packet and the availability of the first destination queue 206a is indicated by the first status signal $SS_1$. The second destination queue 206b, however, remains unavailable, and the second status signal $SS_2$ indicates the unavailability of the second destination queue 206b.

Figure 3G:
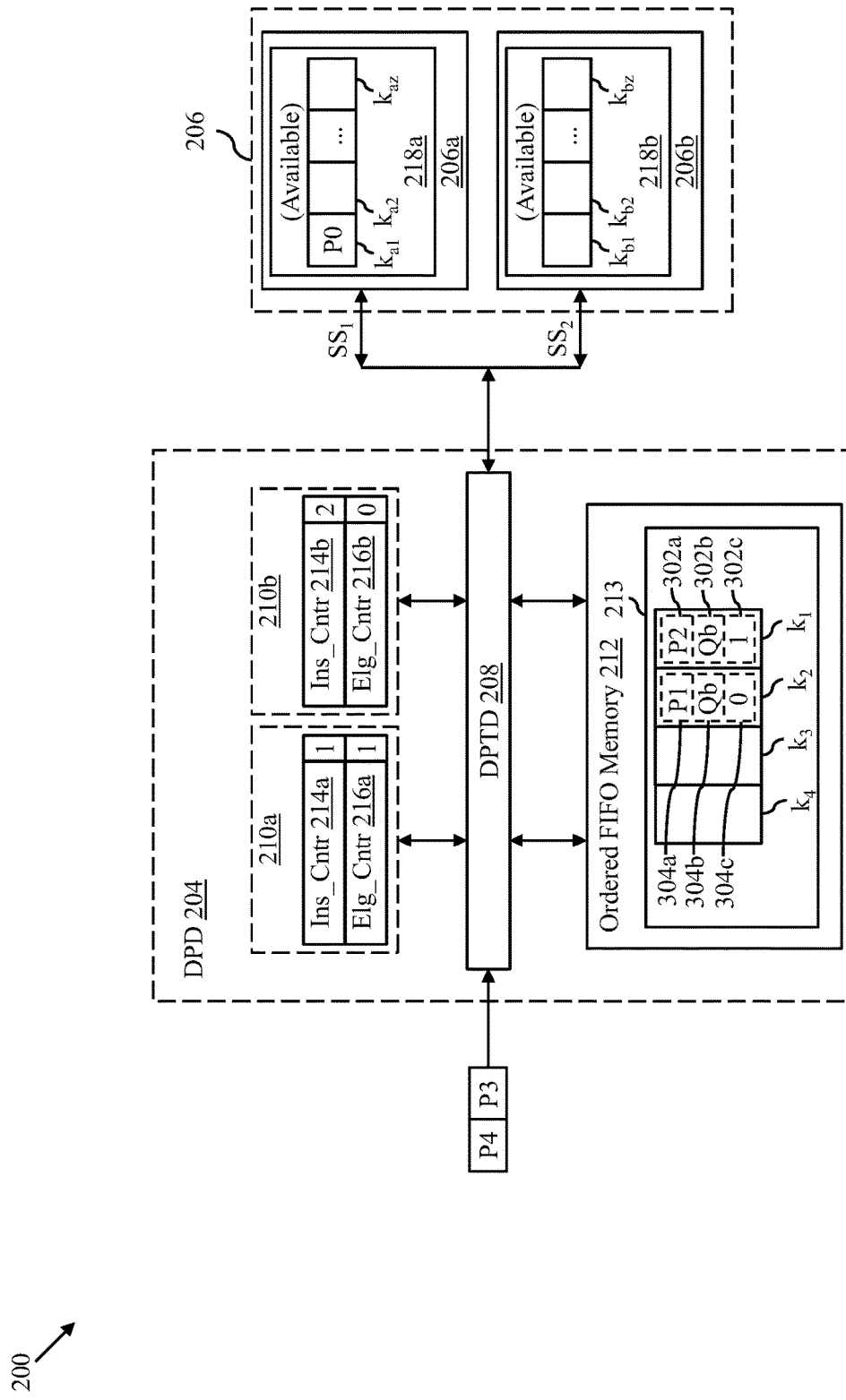
FIG. 3G is a block diagram that illustrates a re-attempt to transmit one of the first, second, and third data packets by the DPTD in accordance with an embodiment of the present invention.

FIG. 3G is a block diagram that illustrates a re-attempt to transmit one of the first, second, and third data packets P0, P1, and P2 by the DPTD 208 in accordance with an embodiment of the present invention. The DPTD 208 re-attempts the transmission at the end of the time interval and based on the third set of rules. Thus, the DPTD 208 re-attempts the transmission of the first data packet P0 based on the fifth rule. The DPTD 208 retrieves the first data packet P0, the first QID, and the first IID from the first memory block $k_1$. The DPTD 208 further transfers contents of the second memory block $k_2$ to the first memory block $k_1$, and contents of the third memory block $k_3$ to the second memory block $k_2$. Thus, the third data packet P2, the third QID, and the third IID are stored in the first through third memory sub-blocks 302a-302c, respectively, and the second data packet P1, the second QID, and the second IID are stored in the fourth through sixth memory sub-blocks 304a-304c, respectively. The DPTD 208 further determines an availability of the first destination queue 206a for receiving the first data packet P0 based on the sixth rule. Since the first status signal $SS_1$ indicates availability of the first destination queue 206a for receiving the first data packet P0 (as illustrated in FIG. 3F), the sixth rule is satisfied. The DPTD 208 further compares a count of the first Elg_Cntr 216a with a value of the first IID based on the seventh rule. As the count and the value are equal to '0', the seventh rule is satisfied (i.e., another data packet associated with the first destination queue 206a and that is received before the first data packet P0 is absent in the ordered FIFO memory 212). As the third set of rules is satisfied, the transmission re-attempt of the first data packet P0 is successful. The DPTD 208 increments the first Elg_Cntr 216*a* (i.e., the first Elg_Cntr 216*a*='1'). In an example, the first data packet P0 is stored in the first memory block $k_{a1}$ of the first memory 218*a*. Further, the second destination queue 206*b* is available for receiving a data packet and the availability of the second destination queue 206*b* is indicated by the second status signal $SS_2$. The first destination queue 206*a* remains available, and the first status signal $SS_1$ indicates the availability of the first destination queue 206*a*.

Figure 3H:
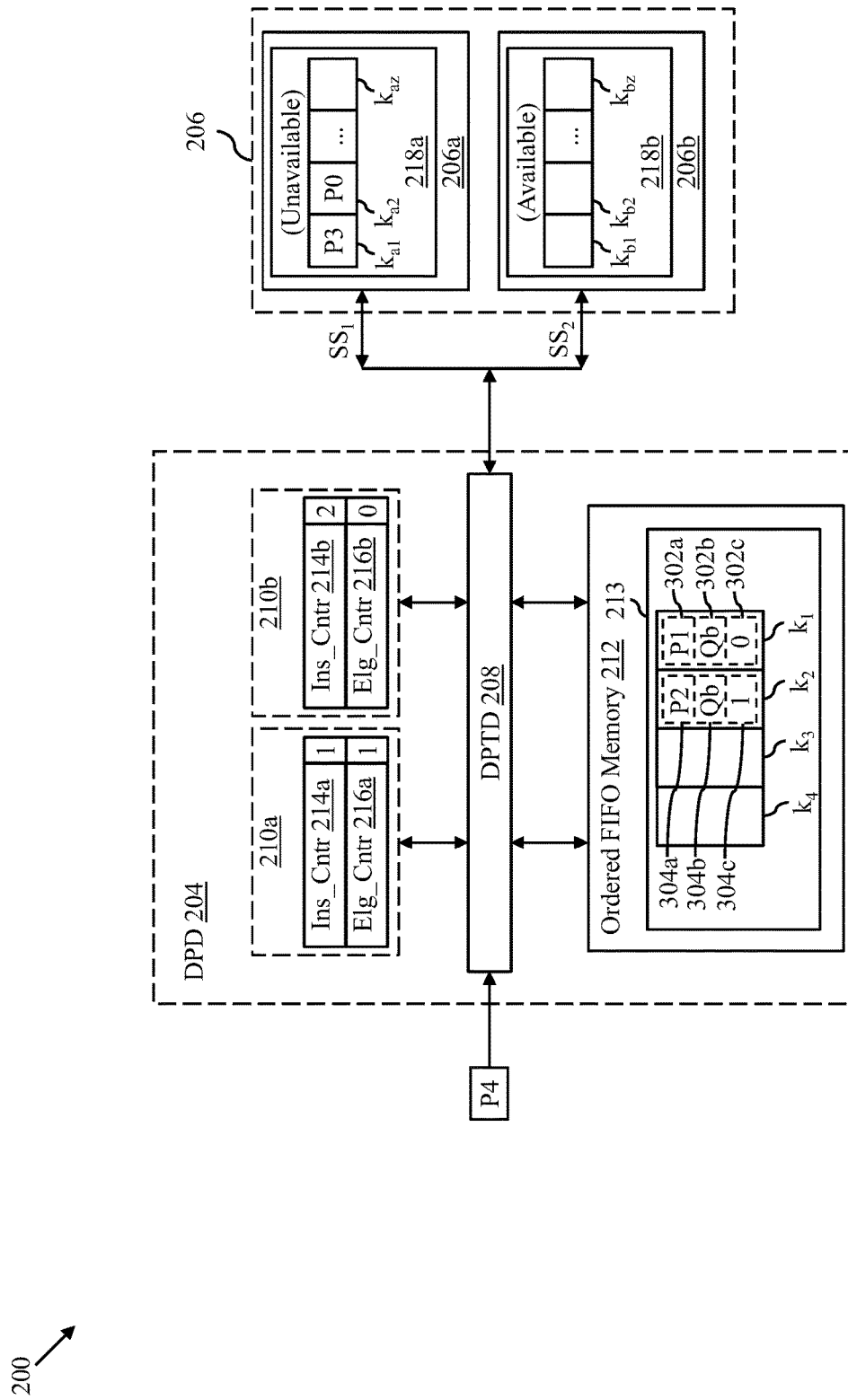
FIG. 3H is a block diagram that illustrates an attempt to transmit the fourth data packet to the first destination queue, and a re-attempt to transmit one of the second and third data packets by the DPTD in accordance with an embodiment of the present invention.

FIG. 3H is a block diagram that illustrates an attempt to transmit the fourth data packet P3 to the first destination queue 206*a*, and a re-attempt to transmit one of the second and third data packets P1 and P2 by the DPTD 208, in accordance with an embodiment of the present invention. The DPTD 208 determines, based on the first rule, an availability of the first destination queue 206*a* for receiving the fourth data packet P3. Since the first status signal $SS_1$ indicates availability of the first destination queue 206*a* for receiving the fourth data packet P3 (as illustrated in FIG. 3G), the first rule is satisfied. The DPTD 208 further compares counts of the first Ins_Cntr 214*a* and the first Elg_Cntr 216*a* based on the second rule. As the counts are equal to '1', the second rule is satisfied. (i.e., another data packet associated with the first destination queue 206*a* is absent in the ordered FIFO memory 212). Thus, the transmission attempt of the fourth data packet P3 to the first destination queue 206*a* is successful. In an example, the first data packet P0 is moved to the second memory block $k_{a2}$ and the fourth data packet P3 is stored in the first memory block $k_{a1}$ of the first memory 218*a*.

The DPTD 208 re-attempts the transmission of one of the second and third data packets P1 and P2 at the end of the time interval and based on the third set of rules. Thus, the DPTD 208 re-attempts the transmission of the third data packet P2 based on the fifth rule. The DPTD 208 retrieves the third data packet P2, the third QID, and the third IID from the first memory block $k_1$. The DPTD 208 further transfers contents of the second memory block $k_2$ to the first memory block $k_1$. Thus, the second data packet P1, the second QID, and the second IID are stored in the first through third memory sub-blocks 302*a*-302*c*, respectively. The DPTD 208 further determines an availability of the second destination queue 206*b* for receiving the third data packet P2 based on the sixth rule. Since the second status signal $SS_2$ indicates availability of the second destination queue 206*b* for receiving the third data packet P2 (as illustrated in FIG. 3G), the sixth rule is satisfied. The DPTD 208 further compares a count of the second Elg_Cntr 216*b* with a value of the third IID based on the seventh rule. As the count and the value are unequal, the seventh rule is unsatisfied (i.e., another data packet associated with the second destination queue 206*b* and that is received before the third data packet P2 is present in the ordered FIFO memory 212). Thus, the transmission re-attempt of the third data packet P2 is unsuccessful. The DPTD 208 reinserts the third data packet P2, the third QID, and the third IID in the fourth through sixth memory sub-blocks 304*a*-304*c*, respectively. Further, the first destination queue 206*a* is unavailable for receiving a data packet and the unavailability of the first destination queue 206*a* is indicated by the first status signal $SS_1$. The second destination queue 206*b*, however, remains available, and the second status signal $SS_2$ indicates the availability of the second destination queue 206*b*.

Figure 3I:
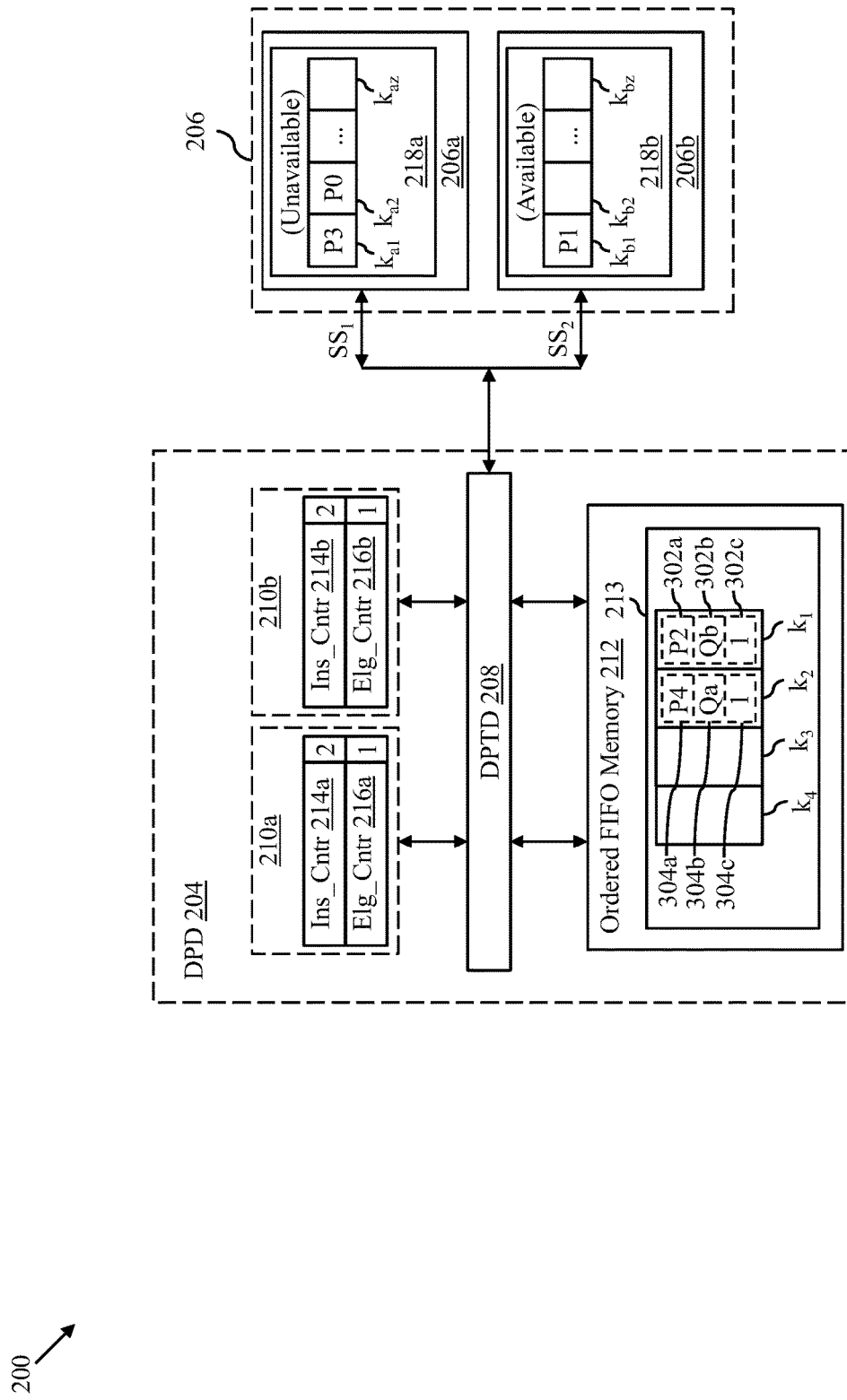
FIG. 3I is a block diagram that illustrates a re-attempt to transmit one of the second and third data packets, and an attempt to transmit the fifth data packet to the first destination queue by the DPTD in accordance with an embodiment of the present invention.

FIG. 3I is a block diagram that illustrates a re-attempt to transmit one of the second and third data packets P1 and P2, and an attempt to transmit the fifth data packet P4 to the first destination queue 206*a* by the DPTD 208 in accordance with an embodiment of the present invention. The DPTD 208 re-attempts the transmission of the second data packet P1 at the end of the time interval and based on the third set of rules. Thus, the DPTD 208 re-attempts the transmission based on the fifth rule. The DPTD 208 retrieves the second data packet P1, the second QID, and the second IID from the first memory block $k_1$. The DPTD 208 further transfers contents of the second memory block $k_2$ to the first memory block $k_1$. Thus, the third data packet P2, the third QID, and the third IID are stored in the first through third memory sub-blocks 302*a*-302*c*, respectively.

The DPTD 208 further determines an availability of the second destination queue 206*b* for receiving the second data packet P1 based on the sixth rule. Since the second status signal $SS_2$ indicates availability of the second destination queue 206*b* for receiving the second data packet P1 (as illustrated in FIG. 3H), the sixth rule is satisfied. The DPTD 208 further compares a count of the second Elg_Cntr 216*b* with a value of the second IID based on the seventh rule. As the count and the value are equal to '0', the seventh rule is satisfied (i.e., another data packet associated with the second destination queue 206*b* and that is received before the second data packet P1 is absent in the ordered FIFO memory 212). As the third set of rules is satisfied, the transmission re-attempt of the second data packet P1 is successful. The DPTD 208 increments the second Elg_Cntr 216*b* (i.e., the second Elg_Cntr 216*b*='1'). In an example, the second data packet P1 is stored in the first memory block km of the second memory 218*b*.

For attempting the transmission of the fifth data packet P4, the DPTD 208 determines, based on the first rule, an availability of the first destination queue 206*a* for receiving the fifth data packet P4. The availability is determined based on the first status signal $SS_1$. The first status signal $SS_1$ indicates unavailability of the first destination queue 206*a* for receiving the fifth data packet P4 (as illustrated in FIG. 3H). The first rule is thus unsatisfied. Thus, the transmission attempt of the fifth data packet P4 is unsuccessful. The DPTD 208 generates, based on the second set of rules, a fourth QID='Qa' and a fourth IID='1' (as the first Ins_Cntr 214*a*='1' when the fifth data packet P4 is received). The DPTD 208 stores the fifth data packet P4, the fourth QID, and the fourth IID in the fourth through sixth memory sub-blocks 304*a*-304*c*, respectively, and increments the first Ins_Cntr 214*a* (i.e., the first Ins_Cntr 214*a*='2'). Further, the second destination queue 206*b* remains available and the availability of the second destination queue 206*b* is indicated by the second status signal $SS_2$. The first destination queue 206*a* remains unavailable, and the first status signal $SS_1$ indicates the unavailability of the first destination queue 206*a*.

Figure 3J:
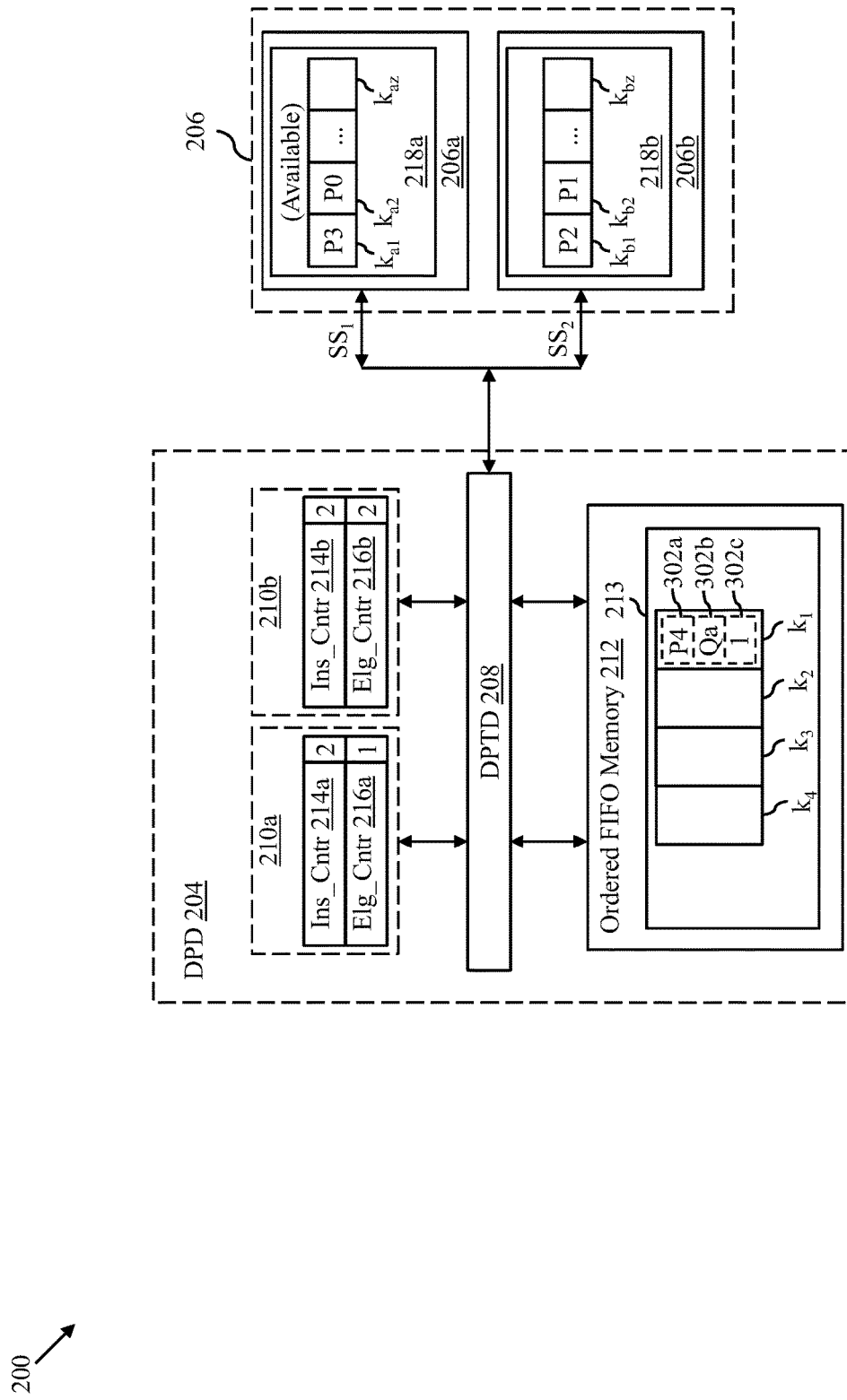
FIG. 3J is a block diagram that illustrates a re-attempt to transmit one of the third and fifth data packets by the DPTD in accordance with an embodiment of the present invention.

FIG. 3J is a block diagram that illustrates a re-attempt to transmit one of the third and fifth data packets P2 and P4 by the DPTD 208 in accordance with an embodiment of the present invention. The DPTD 208 re-attempts the transmission of the third data packet P2 at the end of the time interval and based on the third set of rules. Thus, the DPTD 208 re-attempts the transmission based on the fifth rule. The DPTD 208 retrieves the third data packet P2, the third QID, and the third IID from the first memory block $k_1$. The DPTD 208 further transfers contents of the second memory block $k_2$ to the first memory block $k_1$. Thus, the fifth data packet P4, the fourth QID, and the fourth IID are stored in the first through third memory sub-blocks 302*a*-302*c*, respectively.

The DPTD 208 further determines an availability of the second destination queue 206*b* for receiving the third data packet P2 based on the sixth rule. Since the second status signal $SS_2$ indicates availability of the second destination queue 206b for receiving the third data packet P2 (as illustrated in FIG. 3I), the sixth rule is satisfied. The DPTD 208 further compares a count of the second Elg_Cntr 216b with a value of the third IID based on the seventh rule. As the count and the value are equal to '1', the seventh rule is satisfied (i.e., another data packet associated with the second destination queue 206b and that is received before the third data packet P2 is absent in the ordered FIFO memory 212). As the third set of rules is satisfied, the transmission re-attempt of the third data packet P2 is successful. The DPTD 208 increments the second Elg_Cntr 216b (i.e., the second Elg_Cntr 216b='2'). In an example, the second data packet P1 is moved to the second memory block $k_{b2}$ and the third data packet P2 is stored in the first memory block $k_{b1}$ of the second memory 218b. Further, the first destination queue 206a is available for receiving a data packet, and the first status signal $SS_1$ indicates the availability of the first destination queue 206a.

Figure 3K:
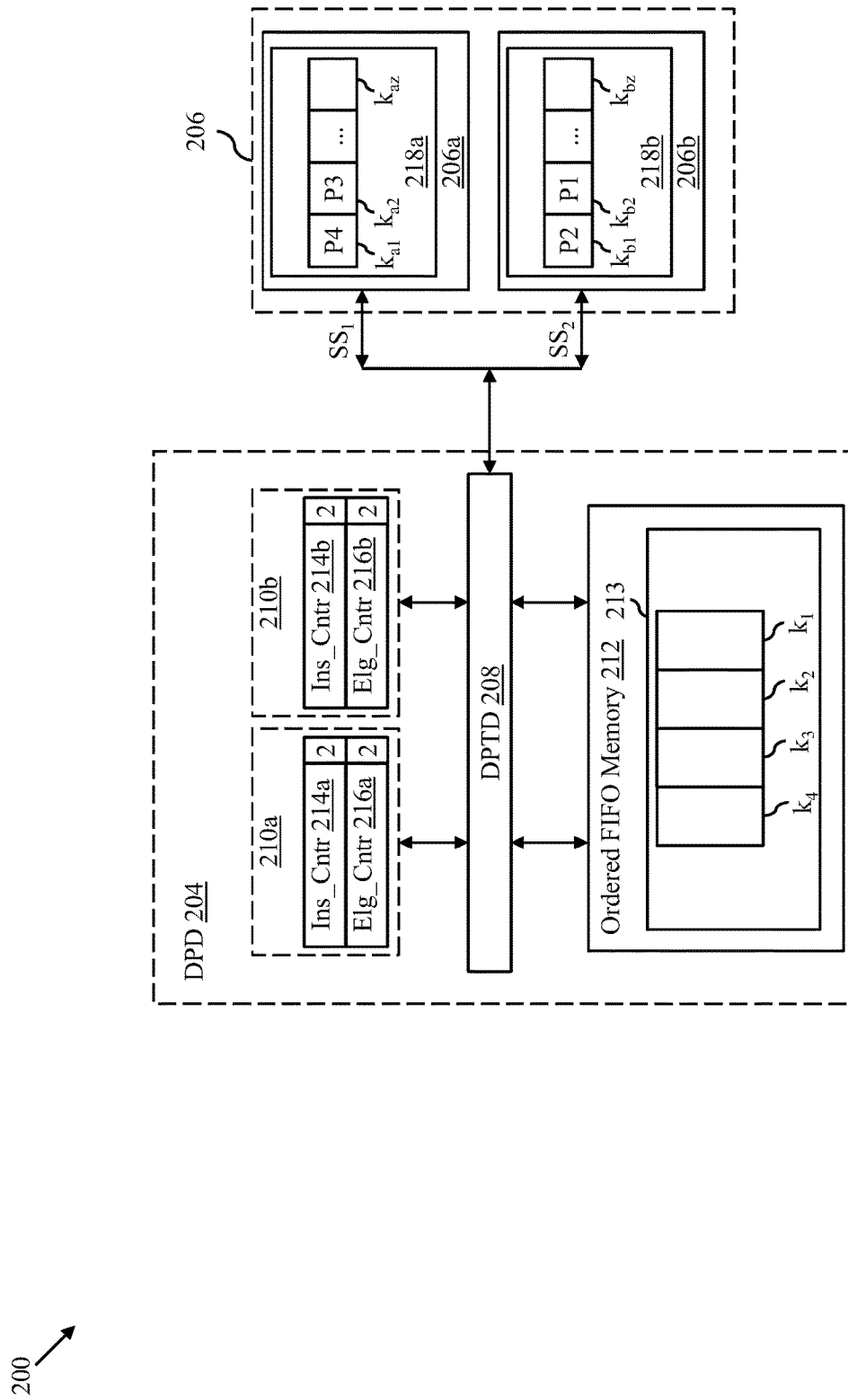
FIG. 3K is a block diagram that illustrates a re-attempt to transmit the fifth data packet to the first destination queue by the DPTD in accordance with an embodiment of the present invention.

FIG. 3K is a block diagram that illustrates a re-attempt to transmit the fifth data packet P4 to the first destination queue 206a by the DPTD 208 in accordance with an embodiment of the present invention. The DPTD 208 re-attempts the transmission at the end of the time interval and based on the third set of rules. Thus, the fifth data packet P4, the fourth QID, and the fourth IID are retrieved from the first memory block $k_1$ by the DPTD 208. The DPTD 208 further determines an availability of the first destination queue 206a for receiving the fifth data packet P4 based on the sixth rule. Since the first status signal S Si indicates availability of the first destination queue 206a for receiving the fifth data packet P4 (as illustrated in FIG. 3J), the sixth rule is satisfied. The DPTD 208 further compares a count of the first Elg_Cntr 216a with a value of the fourth IID based on the seventh rule. As the count and the value are equal to '1', the seventh rule is satisfied (i.e., another data packet associated with the first destination queue 206a and that is received before the fifth data packet P4 is absent in the ordered FIFO memory 212). As the third set of rules is satisfied, the transmission re-attempt of the fifth data packet P4 is successful. The DPTD 208 increments the first Elg_Cntr 216a (i.e., the first Elg_Cntr 216a='2'). Thus, the DPD 204 ensures that data packets associated with a destination queue are transmitted to the destination queue in a manner that is same as an order of reception, without causing the HOLB problem. For example, the first, fourth and fifth data packets P0, P3, and P4 are transmitted to the first destination queue 206a in a manner that is same as an order of reception of the first, fourth and fifth data packets P0, P3, and P4, without causing the HOLB problem. Similarly, the second and third data packets P1 and P2 are transmitted to the second destination queue 206b, without causing the HOLB problem. In an example, the first and fourth data packets P0 and P3 are moved to the third memory block $k_{a3}$ (not shown) and second memory block $k_{a2}$, respectively, and the fifth data packet P4 is stored in the first memory block $k_{a1}$ of the first memory 218a.

The DPD 204 transmits the data packets P0-PN without causing the HOLB problem. Hence, the delay in the transmission of the data packets P0-PN by the DPD 204 reduces as compared to the delay in the transmission by conventional DPDs. The reduction in the delay reduces glitches that occur due to the delay (i.e., latency glitches). Thus, the DPD 204 is a low-latency data packet distributor. Further, as the ordered FIFO memory 212 stores a maximum of 'm*o' number of data packets, a need for increasing 'o' number of memory blocks in each of the first through $t^{th}$ memories 218a-218t is eliminated.

Figure 4:
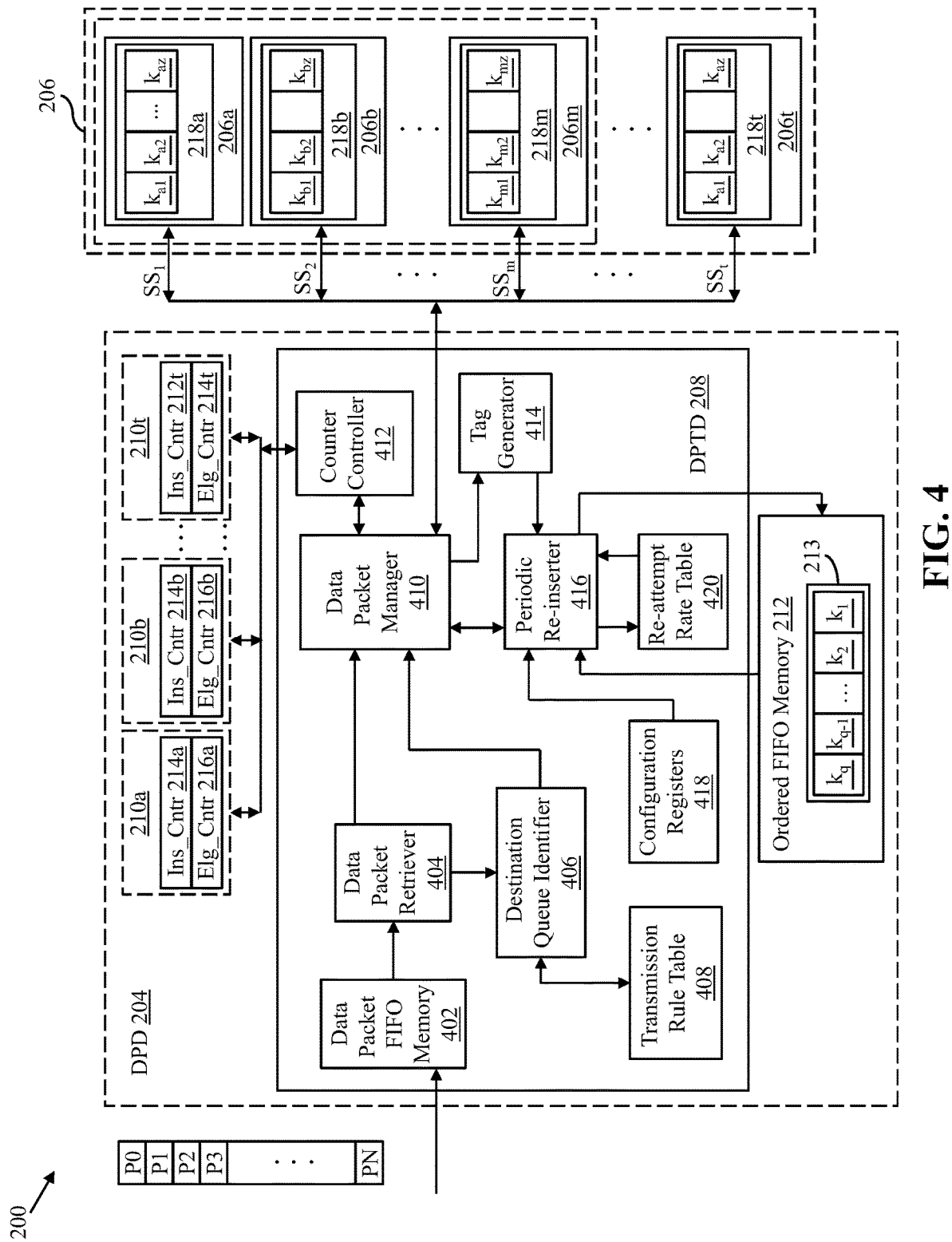
FIG. 4 is a block diagram that is a block diagram that illustrates the DPTD in accordance with an embodiment of the present invention.

FIG. 4 is a block diagram that illustrates the DPTD 208 in accordance with an embodiment of the present invention. The DPTD 208 includes a data packet FIFO memory 402, a data packet retriever 404, a destination queue identifier 406, a transmission rule table 408, a data packet manager 410, a counter controller 412, a tag generator 414, a periodic re-inserter 416, configuration registers 418, and a re-attempt rate table 420.

The data packet FIFO memory 402 is a memory for temporarily storing a received data packet (such as the first data packet P0). Examples of the data packet FIFO memory 402 are a static random-access memory (SRAM), a dynamic random-access memory (DRAM), and the like. The data packet retriever 404 is connected to the data packet FIFO memory 402 for retrieving the first data packet P0. The data packet retriever 404 includes suitable logic, circuitry, interfaces, and/or code, executable by the circuitry, that may be configured to perform one or more operations for periodically retrieving a data packet from the data packet FIFO memory 402. When multiple data packets are present in the data packet FIFO memory 402, the data packet retriever 404 retrieves a data packet that is received before the remaining data packets by the data packet FIFO memory 402. The data packet retriever 404 simultaneously transmits the first data packet P0 to the destination queue identifier 406 and the data packet manager 410.

The destination queue identifier 406 is connected to the data packet retriever 404 for receiving the first data packet P0. The destination queue identifier 406 includes suitable logic, circuitry, interfaces, and/or code, executable by the circuitry, that may be configured to perform one or more operations for identifying a destination queue for transmission of the first data packet P0. The destination queue identifier 406 reads a header included in the first data packet P0 to identify the destination queue (i.e., the first destination queue 206a) associated with the first data packet P0. In an embodiment, the header includes a destination queue identifier field corresponding to a port address associated with the first destination queue 206a. The destination queue identifier 406 thus extracts the destination queue identifier field for retrieving a port address corresponding to the first destination queue 206a from the transmission rule table 408. The transmission rule table 408 is a look-up table that includes a list of destination queue identifier fields and corresponding port addresses associated with destination queues. The transmission rule table 408 may be implemented as a read-only memory (ROM), a programmable ROM, an SRAM, and the like. The destination queue identifier 406 further transmits the retrieved port address to the data packet manager 410.

The data packet manager 410 is connected to the data packet retriever 404 and the destination queue identifier 406 for receiving the first data packet P0 and the port address, respectively. The data packet manager 410 includes suitable logic, circuitry, interfaces, and/or code, executable by the circuitry, that may be configured to perform one or more operations for transmitting the first data packet P0 to the first destination queue 206a. On receiving the first data packet P0 and the port address, the data packet manager 410 attempts transmission of the first data packet P0 based on the first set of rules. Based on the first rule, the data packet manager 410 determines an availability of the first destination queue 206a for receiving the first data packet P0. The availability is determined by the data packet manager 410 based on the first status signal $SS_1$. If the first rule is satisfied, the data packet manager 410 transmits a first control signal (not shown) to the counter controller 412.

The counter controller 412 includes suitable logic, circuitry, interfaces, and/or code, executable by the circuitry, that may be configured to perform one or more operations for controlling the first through $t^{th}$ sets of counters 210a-210t. Based on the first control signal, the counter controller 412 reads counts of the first Ins_Cntr 214a and the first Elg_Cntr 216a. The counter controller 412 further includes a comparator (not shown) that compares the counts, based on the second rule. Based on the comparison, the counter controller 412 transmits a second control signal (not shown) to the data packet manager 410. The data packet manager 410 determines, based on the second control signal, whether the second rule is satisfied. If the first set of rules is satisfied, the data packet manager 410 transmits the first data packet P0 to the first destination queue 206a (i.e., the transmission attempt is successful). If the first set of rules is unsatisfied, the data packet manager 410 outputs the first data packet P0 to the tag generator.

The tag generator 414 is connected to the data packet manager 410 for receiving the first data packet P0. The tag generator 414 includes suitable logic, circuitry, interfaces, and/or code, executable by the circuitry, that may be configured to perform one or more operations for generating first and second tags for each data packet received from the data packet manager 410. The first and second tags (i.e., the first QID and the first BD) are generated by the tag generator 414 based on the second set of rules. The tag generator 414 provides the first data packet P0, and the first and second tags to the periodic re-inserter 416.

The periodic re-inserter 416 is connected to the tag generator 414 for receiving the first data packet P0, and the first and second tags after the unsuccessful transmission attempt. The periodic re-inserter 416 includes suitable logic, circuitry, interfaces, and/or code, executable by the circuitry, that may be configured to perform one or more operations for initiating a transmission re-attempt of the first data packet P0. The periodic re-inserter 416 stores the first data packet P0, and the first and second tags in the ordered FIFO memory 212, and generates a second indication signal (not shown) which indicates the storage of the first data packet P0 and the first and second tags. The periodic re-inserter 416 further transmits the second indication signal to the data packet manager 410. On receiving the second indication signal, the data packet manager 410 transmits a third control signal (not shown) to the counter controller 412. Based on the third control signal, the counter controller 412 increments the first Ins_Cntr 214a. After an elapse of the time interval, the periodic re-inserter 416 retrieves the first data packet P0 and the first and second tags from the ordered FIFO memory 212, and provides the first data packet P0 and the first and second tags to the data packet manager 410. The data packet manager 410 thus re-attempts transmission of the first data packet P0 based on the third set of rules.

For the re-attempt, the data packet manager 410 determines an availability of the first destination queue 206a for receiving the first data packet P0 based on the sixth rule. The availability is determined by the data packet manager 410 based on the first status signal $SS_1$. If the sixth rule is satisfied, the data packet manager 410 transmits a fourth control signal (not shown) and the second tag (i.e., the first IID) to the counter controller 412. Based on the fourth control signal, the counter controller 412 reads count of the first Elg_Cntr 216a, and the comparator compares the count with a value of the first IID. Based on the comparison, the counter controller 412 transmits a fifth control signal (not shown) to the data packet manager 410. The data packet manager 410 determines, based on the fifth control signal, whether the seventh rule is satisfied. If the third set of rules is satisfied, the data packet manager 410 transmits the first data packet P0 to the first destination queue 206a (i.e., the transmission re-attempt is successful). The data packet manager 410 further transmits a sixth control signal to the counter controller 412. Based on the sixth control signal, the counter controller 412 increments the first Elg_Cntr 216a. If the third set of rules is unsatisfied, the transmission re-attempt is unsuccessful, and the data packet manager 410 provides the first data packet P0 and the first and second tags to the periodic re-inserter 416. The periodic re-inserter 416 reinserts the first data packet P0 and the first and second tags in the ordered FIFO memory 212.

The periodic re-inserter 416 modifies a value of the time interval based on data traffic associated with the DPTS 200. The value is modified by way of the configuration registers 418 and the re-attempt rate table 420. The configuration registers 418 include 'p' number of registers (not shown). Each register stores a threshold value that is indicative of a number of data packets in the data traffic. In an example, when the ordered FIFO memory 212 includes thousand memory blocks, the configuration registers 418 may include first through tenth registers (i.e., 'p'=10). In an example, a threshold value stored in the first register is in a range of one to hundred such as '50'. The threshold value '50' indicates that the value of the time interval is to be changed when a number of data packets stored in the ordered FIFO memory 212 exceeds the threshold value '50'. Likewise, each of the second through tenth registers stores a threshold value. The configuration registers 418 output the corresponding threshold value of each register. In an embodiment, the configuration registers 418 are configured in real-time by way of the external processor.

The periodic re-inserter 416 is further connected to the configuration registers 418 for receiving each threshold value. Further, the periodic re-inserter 416 receives, from the ordered FIFO memory 212, the first indication signal indicating the count of data packets stored in the ordered FIFO memory 212. The periodic re-inserter 416 iteratively compares the count with each threshold value. The periodic re-inserter 416 selects a threshold value that is approximately equal to the count. A value of the time interval corresponding to the selected threshold value is retrieved by the periodic re-inserter 416 from the re-attempt rate table 420.

The re-attempt rate table 420 is a look-up table that includes a list of each threshold value and a corresponding value of the time interval. The re-attempt rate table 420 may be implemented as a ROM, a programmable ROM, an SRAM, and the like. The periodic re-inserter 416 modifies a current value of the time interval to the retrieved value of the time interval.

Figure 5A:
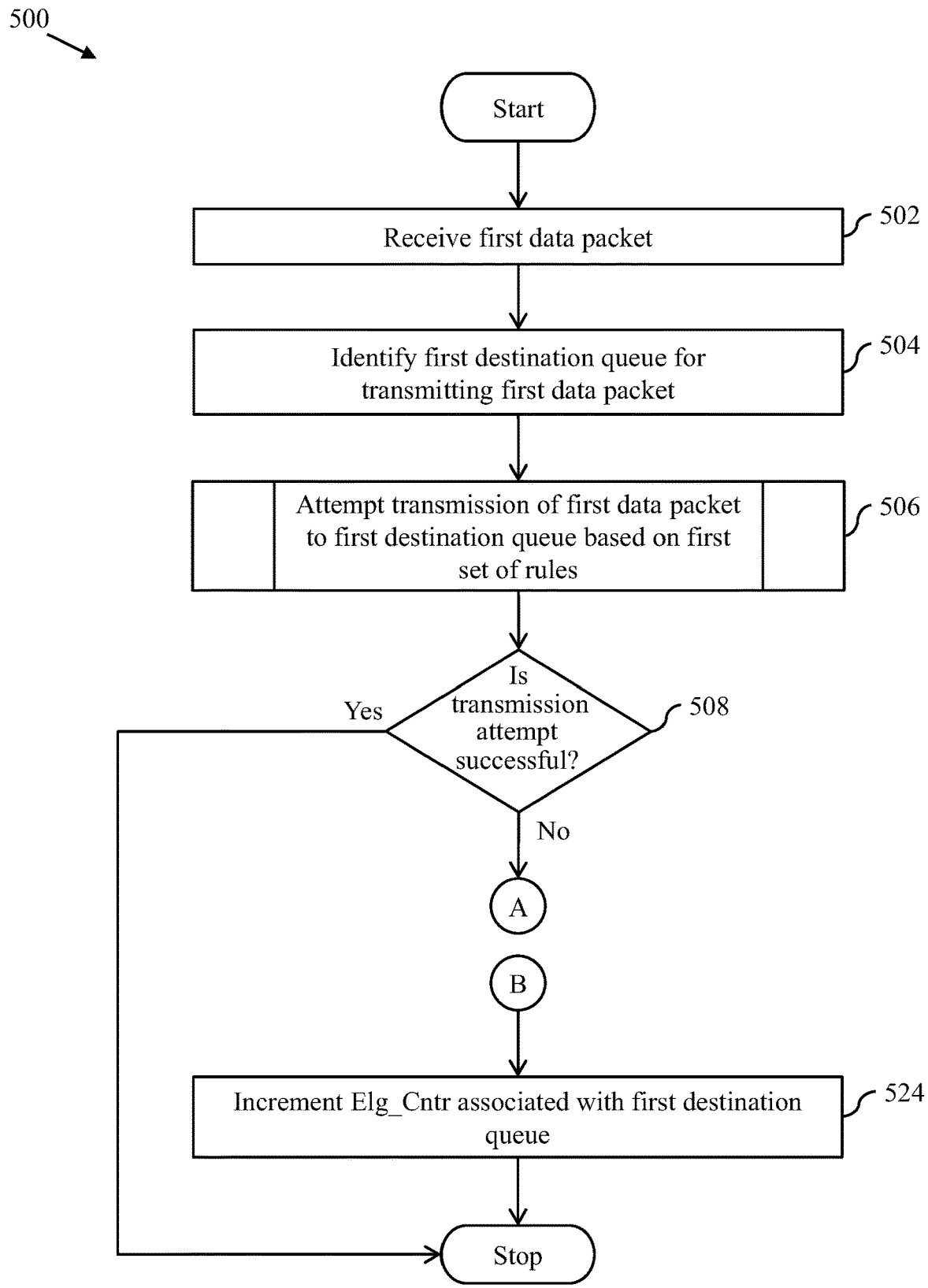
FIGS. 5A-5D, collectively, represent a flowchart of a method for transmitting a data packet by the DPD in accordance with an embodiment of the present invention.

FIGS. 5A-5D, collectively, represent a flow chart 500 of a method for transmitting a data packet by the DPTD 208 in accordance with an embodiment of the present invention. For the sake of simplicity and without deviating from the scope of the invention, it is assumed that the first data packet P0 is received and transmitted by the DPTD 208. Referring now to FIG. 5A, at step 502, the DPTD 208 receives the first data packet P0. At step 504, the DPTD 208 identifies a destination queue (i.e., the first destination queue 206a) for transmitting the first data packet P0. The first destination queue 206a is identified by the DPTD 208 based on a header included in the first data packet P0. At step 506, the DPTD 208 attempts transmission of the first data packet P0 to the first destination queue 206a based on the first set of rules.

Figure 5B:
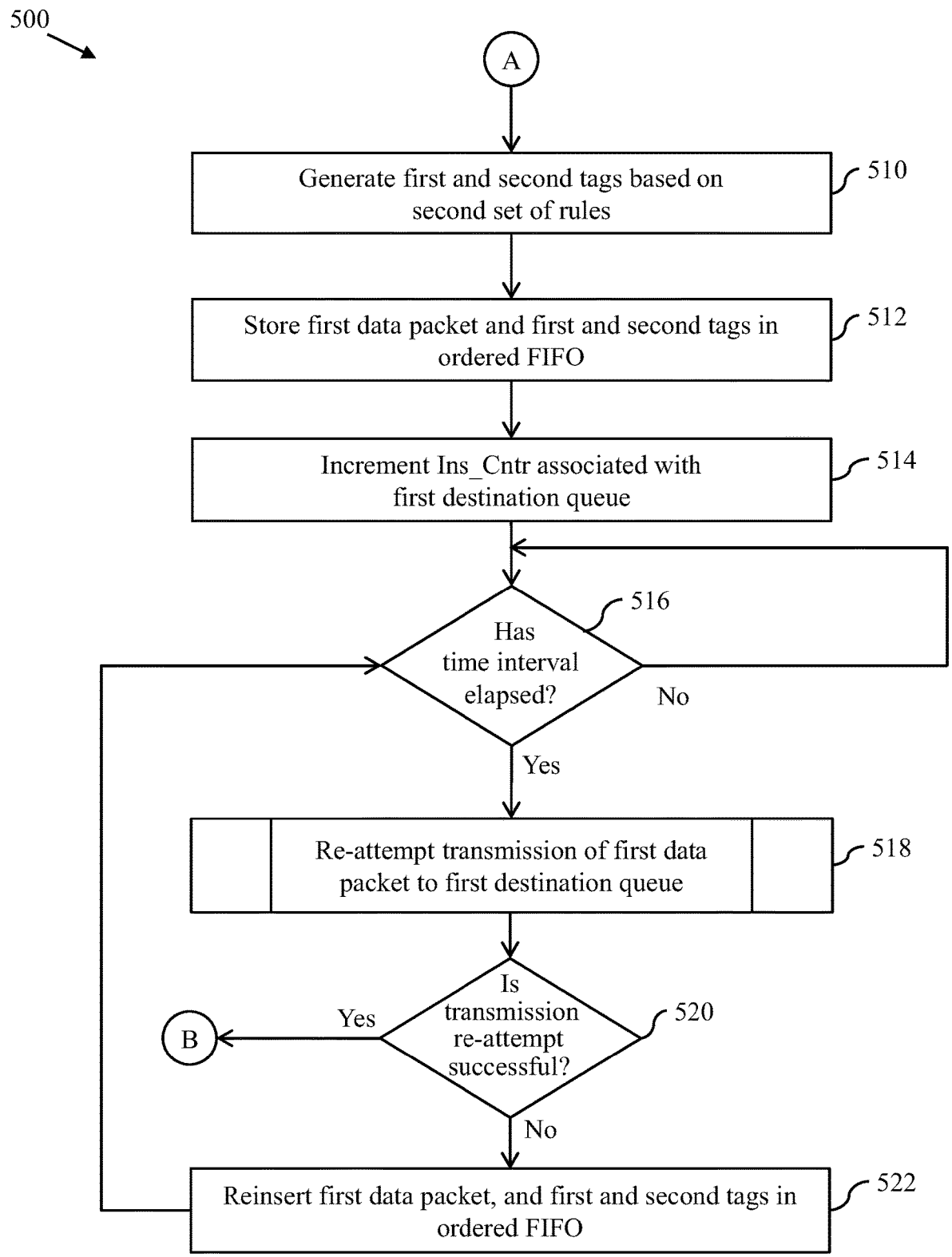
Figure 5C:
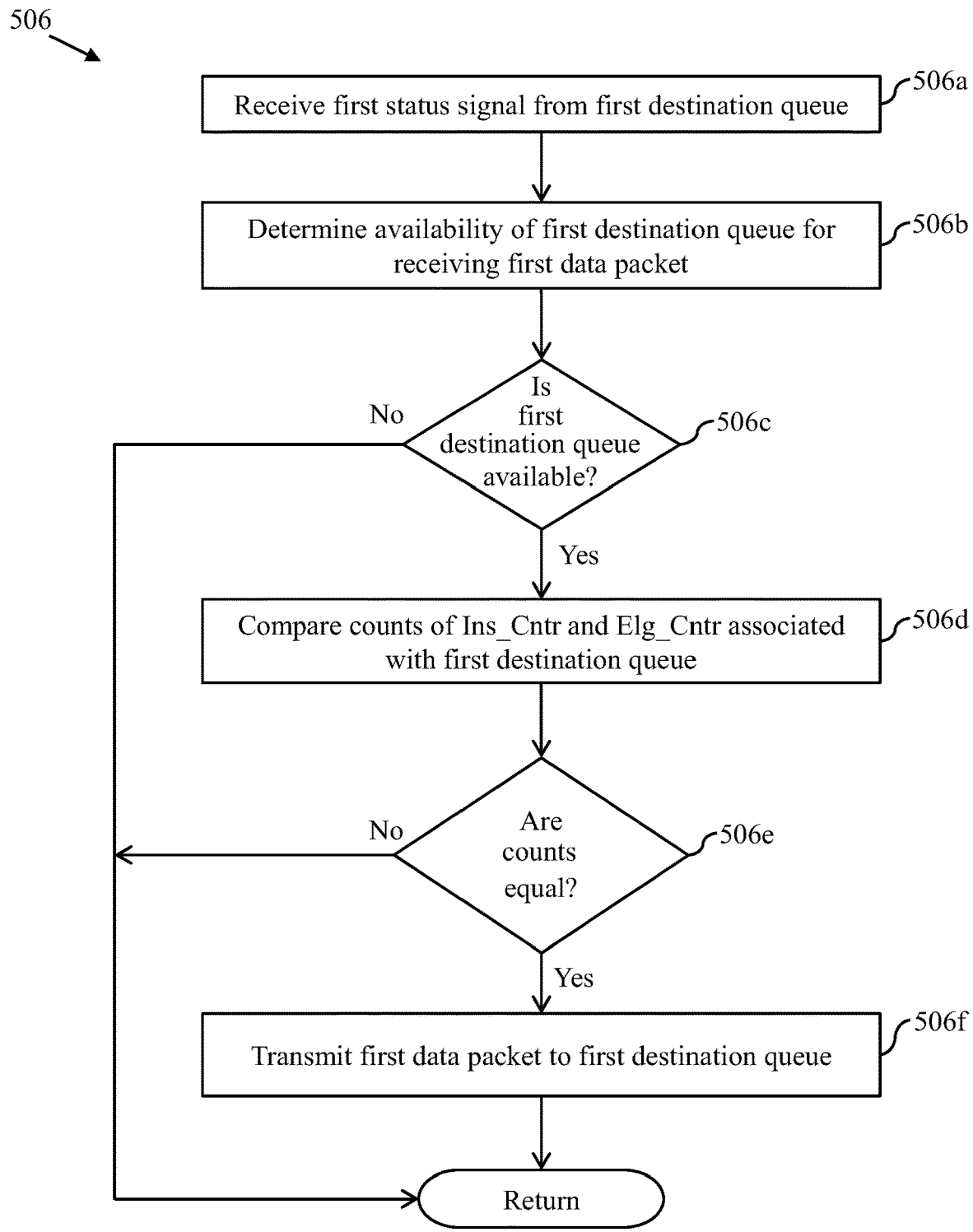

Referring now to FIG. 5C, at step 506a, the DPTD 208 receives the first status signal $SS_1$ from the first destination queue 206a. The first status signal $SS_1$ is indicative of the storage status of the first destination queue 206a. At step 506b, the DPTD 208 determines an availability of the first destination queue 206a for receiving the first data packet P0. The availability is determined by the DPTD 208 based on the first status signal $SS_1$. At step 506c, the DPTD 208 checks whether the first destination queue 206a is available. If at step 506c, it is determined that the first destination queue 206a is available, step 506d is executed. At step 506d, the DPTD 208 compares counts of the corresponding Ins_Cntr and Elg_Cntr associated with the first destination queue 206a, i.e., the first Ins_Cntr 214a and the first Elg_Cntr 216a. At step 506e, the DPTD 208 determines whether the counts are equal. If at step 506e, it is determined that the counts are equal, step 506f is executed. At step 506f, the DPTD 208 transmits the first data packet P0 to the first destination queue 206a (i.e., the transmission attempt is successful) and step 508 is executed. If at step 506e, it is determined that the counts are unequal, the transmission attempt is unsuccessful and step 508 is executed. If at step 506c, it is determined that the first destination queue 206a is unavailable, the transmission attempt is unsuccessful and step 508 is executed.

Referring back to FIG. 5A, at step 508, the DPTD 208 determines whether the transmission attempt is successful. If at step 508, it is determined that the transmission attempt is unsuccessful, step 510 is executed. Referring now to FIG. 5B, at step 510, the DPTD 208 generates first and second tags based on the second set of rules. Thus, the DPTD 208 generates the first QID='Qa' (i.e., the first tag) and the first IID='0' (i.e., the second tag). At step 512, the DPTD 208 stores the first data packet P0 and the first and second tags in the ordered FIFO memory 212. The first data packet P0, the first QID, and the first IID are stored in the first memory block $k_1$ by the DPTD 208. At step 514, the DPTD 208 increments the corresponding Ins_Cntr associated with the first destination queue 206a, i.e., the first Ins_Cntr 214a. At step 516, the DPTD 208 determines whether the time interval has elapsed. If at step 516, it is determined that the time interval has not elapsed, the DPTD 208 waits for the time interval to elapse. If at step 516, it is determined that the time interval has elapsed, step 518 is executed. At step 518, the DPTD 208 re-attempts the transmission of the first data packet P0 to the first destination queue 206a. The DPTD 208 re-attempts the transmission based on the third set of rules.

Figure 5D:
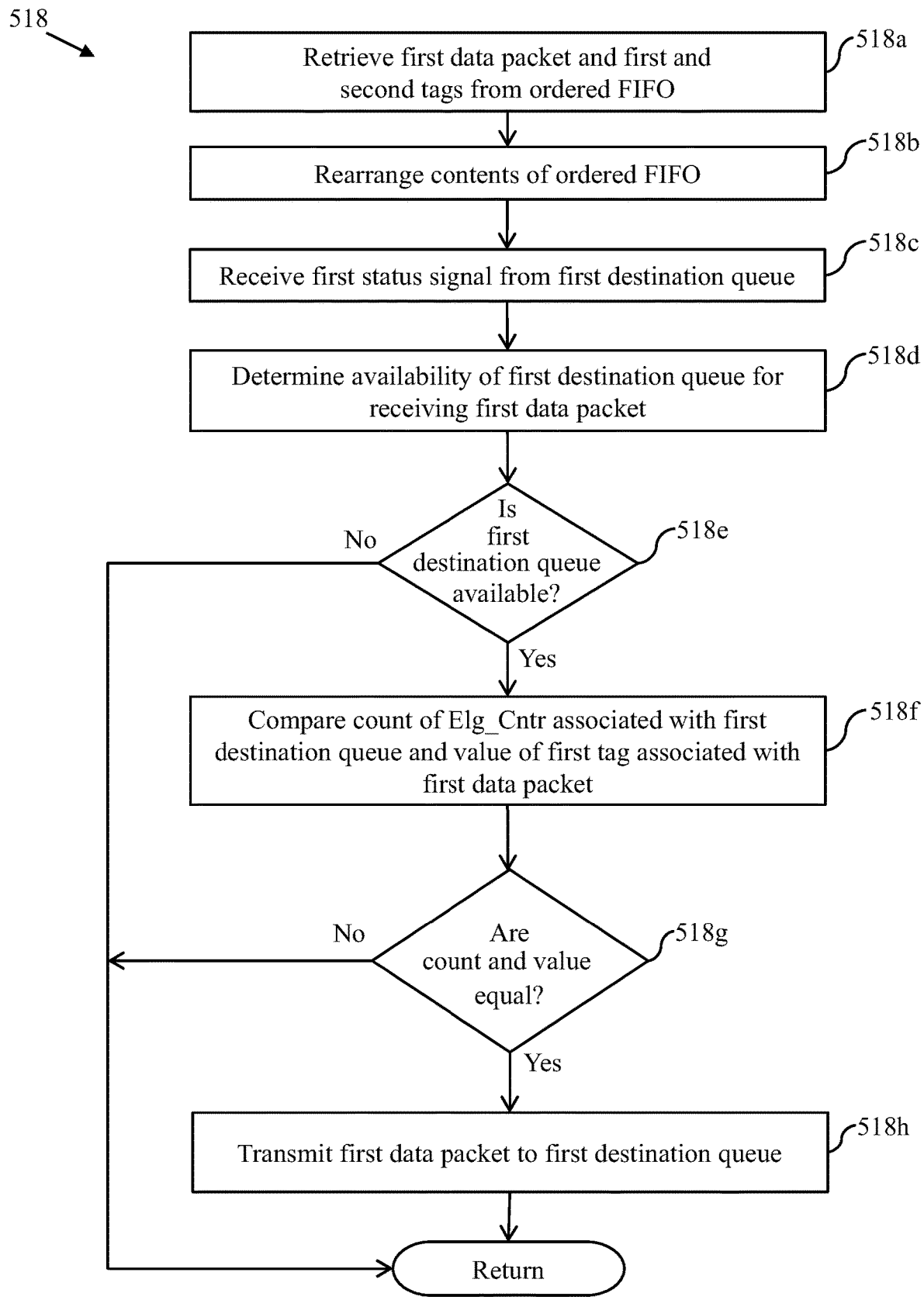

Referring now to FIG. 5D, at step 518a, the DPTD 208 retrieves the first data packet P0 and the first and second tags from the ordered FIFO memory 212. At step 518b, the DPTD 208 rearranges contents (i.e., data packets and corresponding first and second tags) of the ordered FIFO memory 212. The contents of the ordered FIFO memory 212 are rearranged by the DPTD 208 based on the fifth rule. At step 518c, the DPTD 208 receives the first status signal $SS_1$ from the first destination queue 206a. At step 518d, the DPTD 208 determines an availability of the first destination queue 206a for receiving the first data packet P0. The availability is determined by the DPTD 208 based on the first status signal $SS_1$. At step 518e, the DPTD 208 checks whether the first destination queue 206a is available. If at step 518e, it is determined that the first destination queue 206a is available, step 518f is executed. At step 518f, the DPTD 208 compares a count of the first Elg_Cntr 216a and a value of the second tag (i.e., the first IID). At step 518g, the DPTD 208 determines whether the count and the value are equal. If at step 518g, it is determined that the count and the value are equal, step 518h is executed. At step 518h, the DPTD 208 transmits the first data packet P0 to the first destination queue 206a (i.e., the transmission re-attempt is successful) and step 520 is executed. If at step 518g, it is determined that the count and the value are unequal, the transmission re-attempt is unsuccessful and step 520 is executed. If at step 518e, it is determined that the first destination queue 206a is unavailable, the transmission re-attempt is unsuccessful and step 520 is executed.

Referring back to FIG. 5B, at step 520, the DPTD 208 determines whether the transmission re-attempt is successful. If at step 520, it is determined that the transmission re-attempt is unsuccessful, step 522 is executed. At step 522, the DPTD 208 reinserts the first data packet P0 and the first and second tags in the ordered FIFO memory 212, and step 516 is executed. However, if at step 520, it is determined that the transmission re-attempt is successful, step 524 is executed. Referring back to FIG. 5A, at step 524, the DPTD 208 increments the corresponding Elg_Cntr associated with the first destination queue 206a, i.e., the first Elg_Cntr 216a.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A data packet transmission method, comprising:
receiving, by a data packet distributor (DPD), a first data packet from a first host;
identifying, by the DPD, to transmit the first data packet, a first destination queue, wherein the first destination queue is associated with a second host;
attempting, by the DPD, transmission of the first data packet to the first destination queue, wherein the attempt to transmit the first data packet is successful when the first destination queue is available for receiving the first data packet, and first and second values of first and second counters of the DPD are equal, wherein the first and second counters are associated with the first destination queue, and the first and second values are equal when a second data packet associated with the first destination queue, is absent in a memory linked to the DPD, and wherein the second data packet is received by the DPD before the first data packet is received by the DPD;
storing, by the DPD, the first data packet in the memory when the attempt to transmit the first data packet is unsuccessful, wherein the attempt is unsuccessful when the second data packet is present in the memory or the first destination queue is unavailable for receiving the first data packet; and
re-attempting, by the DPD, the transmission of the first data packet to the first destination queue after the attempt to transmit the first data packet is unsuccessful, wherein the re-attempt is successful when the second data packet is transmitted to the first destination queue before the first data packet is transmitted to the first destination queue, and the first destination queue is available for receiving the first data packet.

2. The data packet transmission method of claim 1, wherein the first destination queue is identified based on a header included in the first data packet.

3. The data packet transmission method of claim 1, wherein the steps of attempting and re-attempting the transmission of the first data packet to the first destination queue further comprise:
  receiving, by the DPD, from the first destination queue, a status signal that indicates a storage status of the first destination queue; and
  determining, by the DPD, based on the status signal, the availability of the first destination queue for receiving the first data packet.

4. The data packet transmission method of claim 1, wherein the step of attempting the transmission of the first data packet to the first destination queue further comprises:
  comparing, by the DPD, when the first data packet is received, the first and second values, wherein the first value is indicative of a first count of data packets that are stored in the memory, and the second value is indicative of a second count of data packets that are successfully transmitted to the first destination queue from the first count of data packets, and wherein an inequality of the first value to the second value indicates that the second data packet is present in the memory.

5. The data packet transmission method of claim 4, further comprising incrementing, by the DPD, the first counter when the first data packet is stored in the memory.

6. The data packet transmission method of claim 4, further comprising incrementing, by the DPD, the second counter when the first data packet stored in the memory is successfully transmitted to the first destination queue.

7. The data packet transmission method of claim 1, wherein the transmission of the first data packet to the first destination queue is re-attempted after a re-attempt time interval, and wherein the re-attempt time interval is determined based on at least one of a rate at which the DPD receives a plurality of data packets that include the first and second data packets, a time duration for which the first destination queue is unavailable for receiving at least one data packet of the plurality of data packets, and an occupancy status of the memory.

8. A data packet distributor (DPD), comprising:
  a memory;
  a set of counters comprising first and second counters, wherein the set of counters is associated with a first destination queue that is coupled with the DPD, and wherein the first and second counters have first and second values, respectively; and
  a data packet transmission device (DPTD) connected to the memory and the set of counters, wherein the DPTD is configured to:
    receive a first data packet from a first host;
    identify the first destination queue, for transmitting the first data packet to theme first destination queue, wherein the first destination queue is associated with a second host;
    attempt transmission of the first data packet to the first destination queue, wherein the attempt to transmit the first data packet is successful when the first destination queue is available for receiving the first data packet, and the first and second values are equal, wherein the first and second values are equal when a second data packet that is associated with the first destination queue is absent in the memory, and wherein the second data packet is received by the DPTD before the first data packet is received by the DPTD;
    store the first data packet in the memory when the attempt to transmit the first data packet is unsuccessful, wherein the attempt is unsuccessful when the second data packet is present in the memory or the first destination queue is unavailable for receiving the first data packet; and
    re-attempt the transmission of the first data packet to the first destination queue after the attempt to transmit the first data packet is unsuccessful, wherein the re-attempt is successful when the second data packet is transmitted to the first destination queue before the first data packet is transmitted to the first destination queue and the first destination queue is available for receiving the first data packet.

9. The DPD of claim 8, wherein the first destination queue is identified based on a header included in the first data packet.

10. The DPD of claim 8, wherein to attempt and re-attempt the transmission of the first data packet to the first destination queue, the DPTD is further configured to:
  receive, from the first destination queue, a status signal that indicates a storage status of the first destination queue; and
  determine, based on the status signal, the availability of the first destination queue for receiving the first data packet.

11. The DPD of claim 8, wherein to attempt the transmission of the first data packet to the first destination queue, the DPTD is further configured to:
  compare, when the first data packet is received by the DPD, the first and second values, wherein the first value is indicative of a first count of data packets associated with the first destination queue that are received by the DPTD and stored in the memory, and the second value is indicative of a second count of data packets that are successfully transmitted to the first destination queue from the first count of data packets, and wherein an inequality of the first value to the second value indicates that the second data packet is present in the memory.

12. The DPD of claim 8, wherein the DPTD re-attempts the transmission of the first data packet to the first destination queue after a re-attempt time interval, and wherein the re-attempt time interval is determined based on at least one of a rate at which the DPTD receives a plurality of data packets that include the first and second data packets, a time duration for which the first destination queue is unavailable for receiving at least one data packet of the plurality of data packets, and an occupancy status of the memory.

13. The data packet transmission method of claim 1, further comprising generating, by the DPD, first and second tags for each of the first and second data packets when the attempt to transmit each of the first and second data packets to the first destination queue is unsuccessful, respectively, wherein the first tag of each of the first and second data packets is an identifier of the first destination queue, the second tag of the first data packet equals the first value of the first counter when the first data packet is received by the DPD, and the second tag of the second data packet equals the first value of the first counter when the second data packet is received by the DPD.

14. The data packet transmission method of claim 13, wherein the step of re-attempting the transmission of the first data packet to the first destination queue further comprises:
  comparing, by the DPD, the second value with the second tag associated with the first data packet, wherein an equality of the second value to the second tag associated with the first data packet indicates that the second data packet is absent in the memory, and wherein the second data packet is absent from the memory when the second data packet is transmitted to the first destination queue.

15. The DPD of claim 8, wherein the DPTD is further configured to generate first and second tags for each of the first and second data packets when the attempt to transmit each of the first and second data packets to the first destination queue is unsuccessful, respectively, and wherein the first tag of each of the first and second data packets is an identifier of the first destination queue, the second tag of the first data packet equals the first value of the first counter when the first data packet is received by the DPD, and the second tag of the second data packet equals the first value of the first counter when the second data packet is received by the DPD.

16. The DPD of claim 15, wherein to re-attempt the transmission of the first data packet to the first destination queue, the DPTD is further configured to:
compare the second value of the second counter with the second tag associated with the first data packet, wherein an equality of the second value to the second tag of the first data packet indicates that the second data packet is absent in the memory, and wherein the second data packet is absent from the memory when the second data packet is transmitted to the first destination queue.

17. The DPD of claim 15, wherein the second tag of the second data packet indicates that the second data packet is received before the first data packet by the DPD and the second data packet needs to be transmitted to the first destination queue before the first data packet is transmitted to the first destination queue.

18. The DPD of claim 8, wherein the DPTD is further configured to:
increment the first counter when each data packet associated with the first destination queue is stored in the memory, wherein each data packet associated with the first destination queue is stored in the memory when the attempt to transmit each data packet to the first destination queue is unsuccessful; and
increment the second counter when each data packet associated with the first destination queue and that is stored in the memory is successfully transmitted to the first destination queue, wherein a difference between the first and second values is indicative of a number of data packets associated with the first destination queue that are present in the memory.

19. The DPD of claim 8, wherein the DPTD is further configured to receive a third data packet associated with a second destination queue, and wherein the second destination queue is associated with a third host.

20. The DPD of claim 19, wherein the memory is divided into first and second sub-blocks, wherein the first and second sub-blocks are configured to store the first and third data packets, respectively, wherein the third data packet is received after the first data packet is received, and wherein the DPTD is further configured to rearrange contents of the first and second sub-blocks when the attempt to transmit the first data packet is unsuccessful and the DPTD attempts the transmission of the third data packet.

* * * * *